US012236215B2

(12) United States Patent
Asanuma

(10) Patent No.: US 12,236,215 B2
(45) Date of Patent: Feb. 25, 2025

(54) COMPUTER SYSTEM AND APPLICATION PROGRAMING INTREFACE DEVICE TO REALIZE COLLABORATION BETWEEN OBJECTS CATEGORIZED IN ACCORDANCE WITH INPUT/OUTPUT, BY USING AN OBJECT GROUP IN WHICH CATEGORIES OF OBJECTS WHICH CAN BE PLACED ARE DEFINED

(71) Applicant: ASANUMA HOLDINGS CO., LTD., Tokyo (JP)

(72) Inventor: Katsuhide Asanuma, Fujiyoshida (JP)

(73) Assignee: ASANUMA HOLDINGS CO., LTD., Tokyo (JP)

( * ) Notice: Subject to any disclaimer, the term of this patent is extended or adjusted under 35 U.S.C. 154(b) by 85 days.

(21) Appl. No.: 18/003,686

(22) PCT Filed: Jun. 21, 2021

(86) PCT No.: PCT/JP2021/023358
§ 371 (c)(1),
(2) Date: Dec. 28, 2022

(87) PCT Pub. No.: WO2022/004455
PCT Pub. Date: Jan. 6, 2022

(65) Prior Publication Data
US 2023/0259336 A1 Aug. 17, 2023

(30) Foreign Application Priority Data
Jul. 1, 2020 (JP) ................................ 2020-114064

(51) Int. Cl.
*G06F 9/44* (2018.01)
*G06F 8/35* (2018.01)

(52) U.S. Cl.
CPC .................................... *G06F 8/35* (2013.01)

(58) Field of Classification Search
None
See application file for complete search history.

(56) References Cited

U.S. PATENT DOCUMENTS

| | | | | |
|---|---|---|---|---|
| 7,877,248 | B1 * | 1/2011 | Clune | G06F 30/20 703/15 |
| 7,941,438 | B2 * | 5/2011 | Molina-Moreno | G06F 8/35 717/109 |

(Continued)

FOREIGN PATENT DOCUMENTS

| | | |
|---|---|---|
| JP | 2000276338 A | 10/2000 |
| JP | 2007219649 A | 8/2007 |

OTHER PUBLICATIONS

International Search Report issued on Aug. 17, 2021.

*Primary Examiner* — Qamrun Nahar
(74) *Attorney, Agent, or Firm* — Apex Juris, pllc; Tracy M Heims

(57) ABSTRACT

[Problem]
To allow a user not familiar with computer programming to carry out programming or maintenance (reuse, updates)
[Solution]
A computer system which has control objects categorized in accordance with input/output functionality, placement group objects, and a behavior management model for integrating them in terms of functionality, and is configured from a behavior control system and a behavior management model editing system, wherein the control objects have input/output ports and are categorized, the categories can have inheritance relationship, the placement group objects can have processing sequence transition functionality and priority processing request functionality, and wherein on the basis of information on a response to a system and on timing thereof, control objects associated by using such function-
(Continued)

alities are dynamically managed and allow an object to be placed, to be also dynamically placed.

10 Claims, 25 Drawing Sheets

(56) References Cited

U.S. PATENT DOCUMENTS

| | | | | |
|---|---|---|---|---|
| 8,141,031 | B2 * | 3/2012 | Iborra | G06F 8/35<br>717/113 |
| 2003/0069908 | A1 * | 4/2003 | Anthony | G06F 16/258<br>715/251 |
| 2005/0197824 | A1 * | 9/2005 | Van Dalen | G06F 8/24<br>703/28 |
| 2009/0259967 | A1 * | 10/2009 | Davidson | G06F 3/0485<br>715/800 |
| 2014/0200871 | A1 * | 7/2014 | Grace | G06F 8/34<br>703/6 |
| 2020/0019383 | A1 * | 1/2020 | Konoura | G06F 8/30 |
| 2022/0291753 | A1 * | 9/2022 | Erivantcev | G06F 3/0482 |

* cited by examiner

An example of placing, in a GUI, control objects in a placement group

Diagram of relatedness between objects

Processing group (box) definition

Statement class generation

Modeling a category of placers (in a prototype element)

COMPUTER SYSTEM AND APPLICATION PROGRAMING INTREFACE DEVICE TO REALIZE COLLABORATION BETWEEN OBJECTS CATEGORIZED IN ACCORDANCE WITH INPUT/OUTPUT, BY USING AN OBJECT GROUP IN WHICH CATEGORIES OF OBJECTS WHICH CAN BE PLACED ARE DEFINED

TECHNICAL FIELD

The present invention is for a system and an API (application programming interface device) in which by categorizing, through a model-driven architecture technique, classes of program objects in accordance with functionalities of and type information on return values and arguments of methods, and associating classes or instances with group objects having functionalities corresponding to object categories, programming or maintenance (reuse, updates) of a system is allowed to be carried out.

BACKGROUND ART

Patent Document 1 describes a method of configuring a process plant flexibly, which includes receiving an instruction of correction to a current parent object corresponding to an entity of the process plant, and communicating, so as to create a first subset of corrected child objects, the correction to each current child object of a first subset of a set of current child objects so that each current child object included by the set of current child objects derives from the current parent object and corresponds to a separate specifying element of the process plant and that the separate specifying element acts in accordance with instance transformation of the each current child object so as to provide functionalities corresponding to more than one process controlled in the process plant, not communicating the correction to a second subset of the set of current child objects, communicating, so as to create a second subset of corrected child objects, the correction to each of current child objects of a third subset of the set of current child objects making, by generating an instance transformation of the first subset of corrected current child objects and delaying, till a first specified time point, execution of instance transformation of the first subset of current child objects corrected in a first set of separate specifying elements, and then executing the instance transformation of the first subset of corrected current child objects in the first set of separate specifying elements, the first set of separate specifying elements act during run time in accordance with the instance transformation of the first subset of corrected current child objects maintaining instance transformation of the second subset of the set of current child objects so that a second set of separate specified elements corresponding to the second subset of the set of current child objects acts during run time in accordance with the instance transformation of the second subset of the set of current child objects, and delaying, till a second specified time point different from the first specified time point, execution of instance transformation of the second subset of child objects corrected in a third set of separate specifying elements.

Patent Document 2 describes a method of configuring a process plant flexibly, which includes receiving an instruction of correction to a current parent object corresponding to an entity of the process plant, and communicating, so as to create a first subset of corrected child objects, the correction to each current child object of a first subset of a set of current child objects so that each current child object included by the set of current child objects derives from the current parent object and corresponds to a separate specifying element of the process plant and that the separate specifying element acts in accordance with instance transformation of the each current child object so as to provide functionalities corresponding to more than one process controlled in the process plant, not communicating the correction to a second subset of the set of current child objects, making, by generating an instance transformation of the first subset of corrected current child objects and executing the instance transformation of the first subset of corrected current child objects in a first set of separate specifying elements, the first set of separate specifying elements act during run time in accordance with the instance transformation of the first subset of corrected current child objects, and maintaining instance transformation of the second subset of the set of current child objects so that a second set of separate specifying elements corresponding to the second subset of current child objects acts during run time in accordance with the instance transformation of the second subset of current child objects.

Patent Document 3 describes a method of configuring a process plant flexibly, which includes receiving an instruction of updating to a parent object so that each child object of a plurality of child objects derives from the parent object and that instance transformation of the each child object is executed in a separate element so as to execute functionalities corresponding to controlling more than one process in the process plant, updating the parent object on the basis of the instruction so as to generate an updated parent object communicating, so as to generate a set of updated child objects, the updating to a first subset of the plurality of child objects preventing the updating from being communicated to a second subset of the plurality of child objects, and making, by updating a configuration of each of the separate elements corresponding to the set of updated child objects in accordance with the instance transformation of the set of updated child objects, the separate elements act in a real-time manner in accordance with instance transformation of the set of updated child objects.

Patent Document 4 describes a method for processing a programing specification based on graphs in order to disperse processing tasks efficiently between run-time system servers, wherein the method comprises a step of giving a programing specification based on graphs in a user interface, comprising receiving user input to stipulate a plurality of components, wherein each of the plurality of components corresponds to a processing task and wherein at least some of the components have one port or two or more ones, and receiving user input to stipulate a plurality of links, wherein at least some of the links connect an output port of a component upper to the plurality of components with an input port of a component lower to the plurality of components, and a step of processing the programing specification based on graphs in order to specify one subset or two or more ones of the plurality of components, comprising specifying, at least partially on the basis of features of data processing of components to be linked, one subset entrance point or two or more ones and one subset exit point or two or more ones that appear between components in different subsets, forming the subset on the basis of the specified subset entrance point and the specified subset exit point, giving, in the user interface, a visual expression of a subset formed as above, and generating, by making processing tasks corresponding to the components in subsets formed separately be carried out when used for being executed by the run-time system, a code prepared for the subsets formed separately.

PRIOR ART

Patent Documents

Patent Document 1: Japanese Patent No. 6423348
Patent Document 2: JP-A-2019-016400
Patent Document 3: JP-A-2019-016401
Patent Document 4: Japanese Patent No. 6479966

OVERVIEW OF INVENTION

Problem to be Solved by the Invention

Recently, demand for a web system accessed by a lot of users by using portable terminals such as smartphones is growing. It is important for such a web system that telecommunication timing be controlled and distribution targets be managed, especially. Further, it is requested that acquisition, linkage, and distribution of status information about a related web system, and reception and transmission of other asynchronous signals be carried out in appropriate timing. Additionally, the inventor of the present invention considers it to be desirable that even a person not familiar with computer programming can be a system administrator who edits, administers, reuses, and corrects such a system. For since swiftness is required, it is disadvantageous in terms of both expenses and time to request a specialist who has mastered that system each time correction or the like is needed.

Accordingly, the inventor of the present invention considers it to be desirable for a web system accessed by a lot of users by using portable terminals that an API (application programing interface) device be prepared to allow a web system application to be assembled on a GUI (graphical user interface) and to be likewise edited on the GUI.

The present invention has been made in view of such circumstances and is intended to provide a system and an API (application programming interface device) in which by categorizing, through a model-driven architecture technique, classes of program objects in accordance with functionalities of and type information on return values and arguments of methods, and associating classes or instances with group objects having functionalities corresponding to object categories, programming or maintenance (reuse, updates) of a system is allowed to be carried out.

Means to Solve the Problem

The computer system according to the present invention is characterized in being a computer system which has a plurality of control objects which are objects categorized in accordance with input/output functionality and take charge of linkage with a terminal device, a database device, and other systems or devices, a placement group object defined on the basis of category information on the control objects which can be associated, and a behavior management model integrating them in terms of functionality, and is configured from a behavior control system carrying out, by structurally assembling the control objects, behavior management in which to adjust each behavior of the control objects in association with the placement group object and a behavior management model editing system having a control object editing user interface device providing statement functionality of stating functionality detail of the control objects to an application program builder and a behavior management model editing user interface device providing statement functionality of the behavior management model to an application program builder, wherein the control objects have input/output ports having input/output functionality accompanying control of timing including timing of standby, event/trigger wait reception or interrupts and are, by a group of input/output ports categorized in accordance with type and functionality, defined and categorized as control object categories, and wherein the placement group object can, in order to build the behavior management model, have processing sequence transition functionality being transition management functionality based on a transition definition set between category input/output ports and priority processing request functionality being transition management functionality based on identification information on group placement control objects, wherein on the basis of information on a response to a system and on timing thereof, control objects associated by using the processing sequence transition functionality and the priority processing request functionality are dynamically managed.

This allows each processing to be handled not as definition of call relationship but placement in a certain group or position, and allows elements to be easily updated and replaced.

Further, it can make the control object categories have inheritance relationship with each other on condition that input/output functionality be inherited from an inheritance source.

This makes it easy to carry out programing.

Additionally, by setting a placement group object to be indefinite, an object to be placed is allowed to be also dynamically placed.

This allows a once made program to be remade later and an object to be dynamically placed.

Additionally, the application program building method according to the present invention is an application program building method using the above-mentioned computer system and has a category defining step of defining, in accordance with specifications on interfaces, categories of said control objects, or placer categories of control objects associated with said placement group objects or of placers being a placement group, an inheritance step of defining category prototypes of control objects and priority request/processing sequence transition functionalities in correspondence with each other by using inheritance of category information from inheritance source to inheritance destination, and a category designing step of carrying out category designing of control objects by combining the category prototypes.

This allows a user interface device with which to carry out category designing of control objects, to be provided.

Additionally, the application program building method according to the present invention is the above-mentioned application program building method and has a statement class calling step in which to call a statement class corresponding to an instance at a point when any of a control object, a placement group, priority processing request definition, and processing sequence transition definition is specified as a category, or when it is placed a category information extraction step in which to extract category information from a statement class called in the calling step a category requirement calling step in which to call a category requirement on the basis of category information extracted in the category information extraction step, and a category accordance check step in which to check on whether or not a category requirement called in the category requirement calling step and a statement step called in the above statement class calling step accord with each other.

This can provide a user interface device with which even a user not familiar with computer programing can carry out appropriate category designing without any input/output error.

Additionally, the application program building method according to the present invention is the above-mentioned application program building method and has an output source port priority processing request submitting step in which a priority processing request is made by an output source port, a priority processing request receiving step in which to make a priority processing request to an input destination identification group and/or a reference placement group, an information receiving step in which to receive real placement information and/or status information on an identification group and reference placement group subjected to transition definition, a priority condition calculation step in which to calculate priority conditions for an output destination by using information of any one type or more out of transition output information, relatedness real placement information, relatedness status information and real placement information, an identification information extraction step in which to extract, on the basis of priority condition calculation made in the priority condition calculation step, identification information on an input destination placer from identification group real placement information, and a transition output information sending step in which to send transition output information to an input destination identification group port together with transition destination specifying information (a list) or to a corresponding placer port.

This can provide a user interface device with which even a user not familiar with computer programing can process a priority processing request appropriately.

Additionally, the application program building method according to the present invention is the above-mentioned application program building method and has a category accordance check step in which to check on whether a placer accords in category and to determine, if it does not accord, that it cannot be placed, a numerical range accordance check step in which to check on whether numerical range conditions are accorded with, a placer property accordance check step in which to determine that a placer which has been associated cannot be placed if it does not accord with determination conditions in accordance with properties, and an association check target incorporation step, in which to incorporate, into the association check targets, associated placers out of placers which can be placed, and carries out checks from the category accordance check step to the association check target incorporation step, sequentially in an order in which the placers have been registered, for all placers being targets of all the association checks.

This can provide a user interface device with which even a user not familiar with computer programing can process a placement appropriately.

Additionally, the computer system according to the present invention is the above-mentioned computer system, characterized in that said control object editing user interface device realizes said placement group functionality through a graphical user interface, by using a grid sheet where a grid allowed to accommodate object icons are spread in a matrix form.

This can realize placement group functionality in accordance with visual intuition.

Additionally, the computer system according to the present invention is the above-mentioned computer system, characterized in defining said placement group object by using a table in which an object obtained by cutting off part of said grid sheet as a matrix is given said priority processing request functionality and said processing sequence transition functionality as said placement group.

This can realize a user interface device easy to understand a correspondence relationship between a user interface and internal processing.

Additionally, the application program building method according to the present invention is an application program building method using the above-mentioned computer system and has a grid sheet designing step in which to prepare one or a plurality of user interface grid sheets and to give identification information to each of them, a table placing step in which to carry out algorithm designing, to determine a table corresponding to a processing flow, to determine a necessary matrix range, and to allocate the table on a grid sheet, an axis defining step in which to define two axes or three axes of a table matrix on whether they are identification axes acting as an identification group to accommodate modules or processing axes used as transition control information a placer category defining step in which to give an identification axis sequence a placer category definition, and a module placing step in which to place modules on a grid.

This allows even a user not familiar with computer programing to realize easily placement of elements of a grid model.

Advantageous Effects by Invention

As described above, even a user not familiar with computer programing is allowed to build an application program easily.

MODES OF EXECUTING THE INVENTION

As follows, best modes of executing a management system according to the present invention are described in detail through referring to attached drawings. Diagrams from FIG. 1 to FIG. 25 exemplify modes of executing the present invention, and in these diagrams, portions given an identical symbol represent an identical matter and are similar to each other in basic configuration and act.

Figure 24:
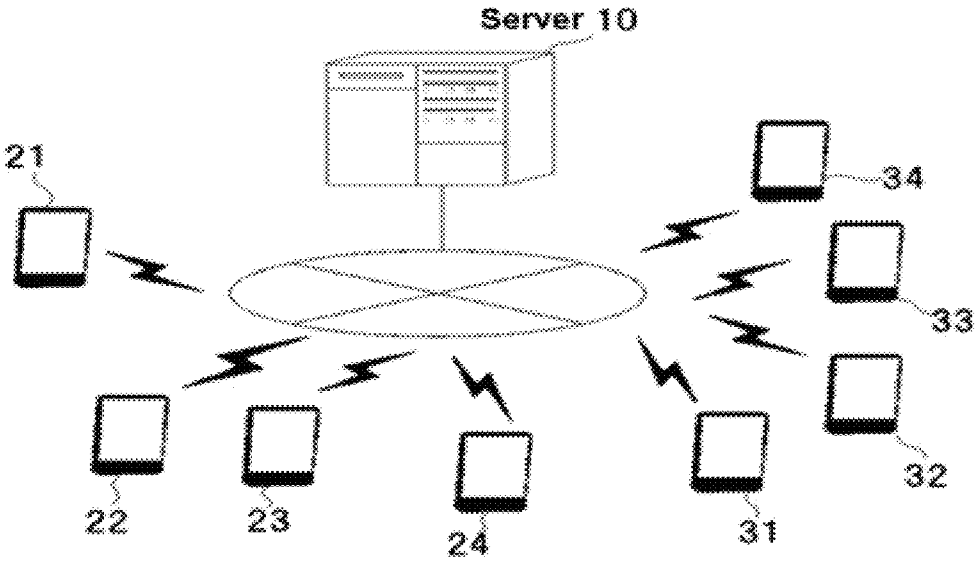

FIG. 24 is a diagram to describe how a business user and an end user are positioned with each other in the computer system according to the present invention. For the internet network shown in an ellipse at the center of the diagram, a server (server computer) 10, administrator user terminals 21, 22, 23, 24 at which an administrator user (business user) who creates an application program to provide customers (ordinary users, end users) with services accesses the server 10 after acquiring an administrator user account, and ordinary user (end user) terminals 31, 32, 33, 34 are shown. The administrator user terminals and ordinary user terminals can be so-called smart phones, tablet computers, laptop computers, and a combination between IC cards or QR-having cards together with reading devices and displaying instruments, pronouncing devices. In FIG. 24, terminals are depicted as directly interacting with the Internet, but they may be also ones to be connected with the Internet through a Wi-Fi device. Further, they may be ones to be connected to the Internet through the cell phone network.

Figure 25:
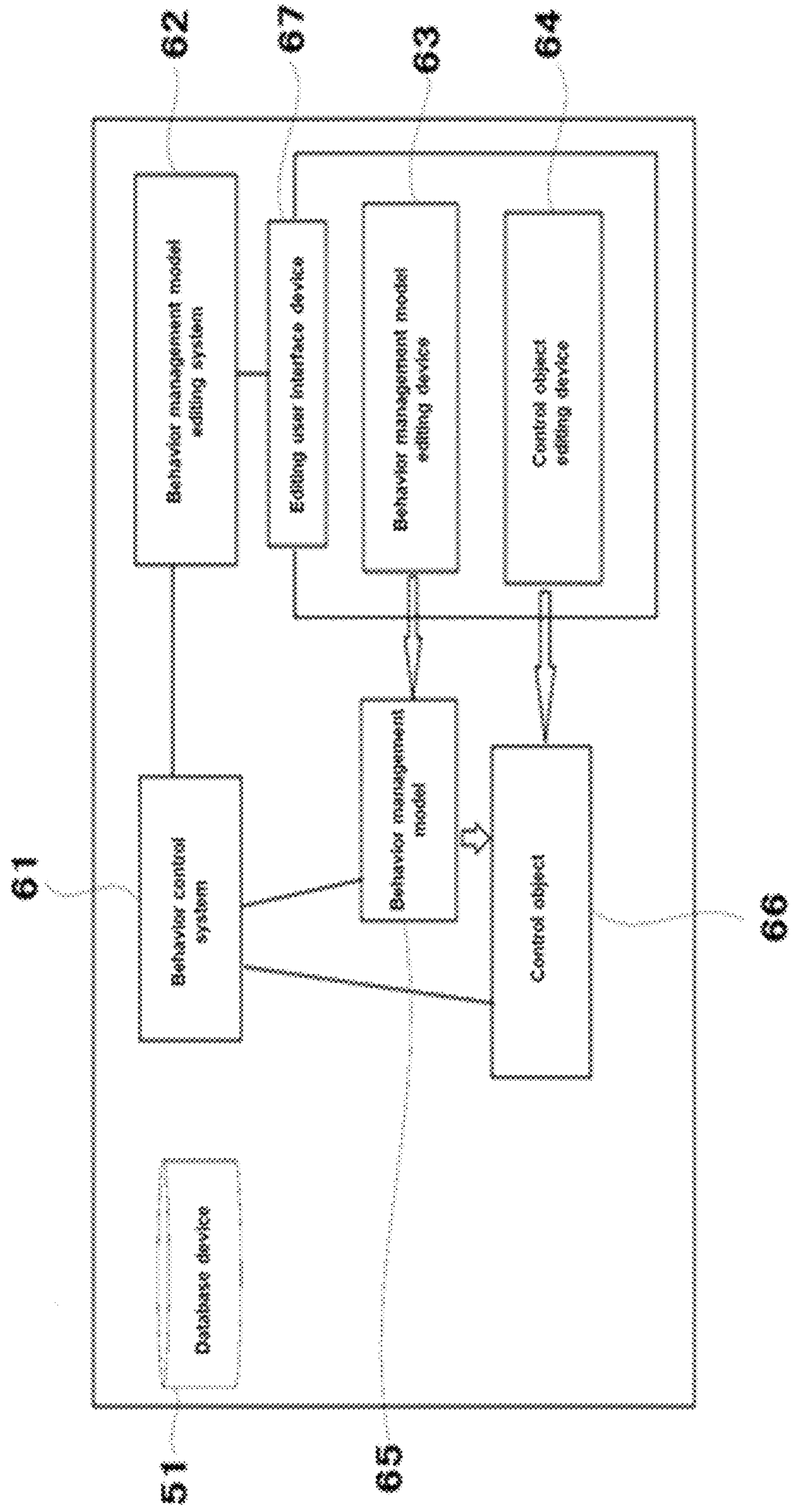

FIG. 25 is a diagram to show how the computer system according to the present invention is configured inside a server. It has a database device 51, a behavior control system 61, a behavior management model editing system 62, a behavior management model 65, and a control object 66 inside the server 10 shown in FIG. 24. Additionally, the behavior management model editing system 62 has an editing user interface device 67, within which a behavior management model editing device 63 and a control object editing device 64 are included.

As follows, a specification of a computer program which, in the case where the computer system according to the present invention is configured by connecting a server computer with a user terminal through the Internet, is installed mainly in the server computer is described principally.

<<Widening Functionality Model (Placement Group)>>

That provides an API (application programing interface) device to realize collaboration between objects categorized in accordance with input/output, by using an object group in which for each of such categories, an object placement count is defined.

Basic Model

Figure 1:
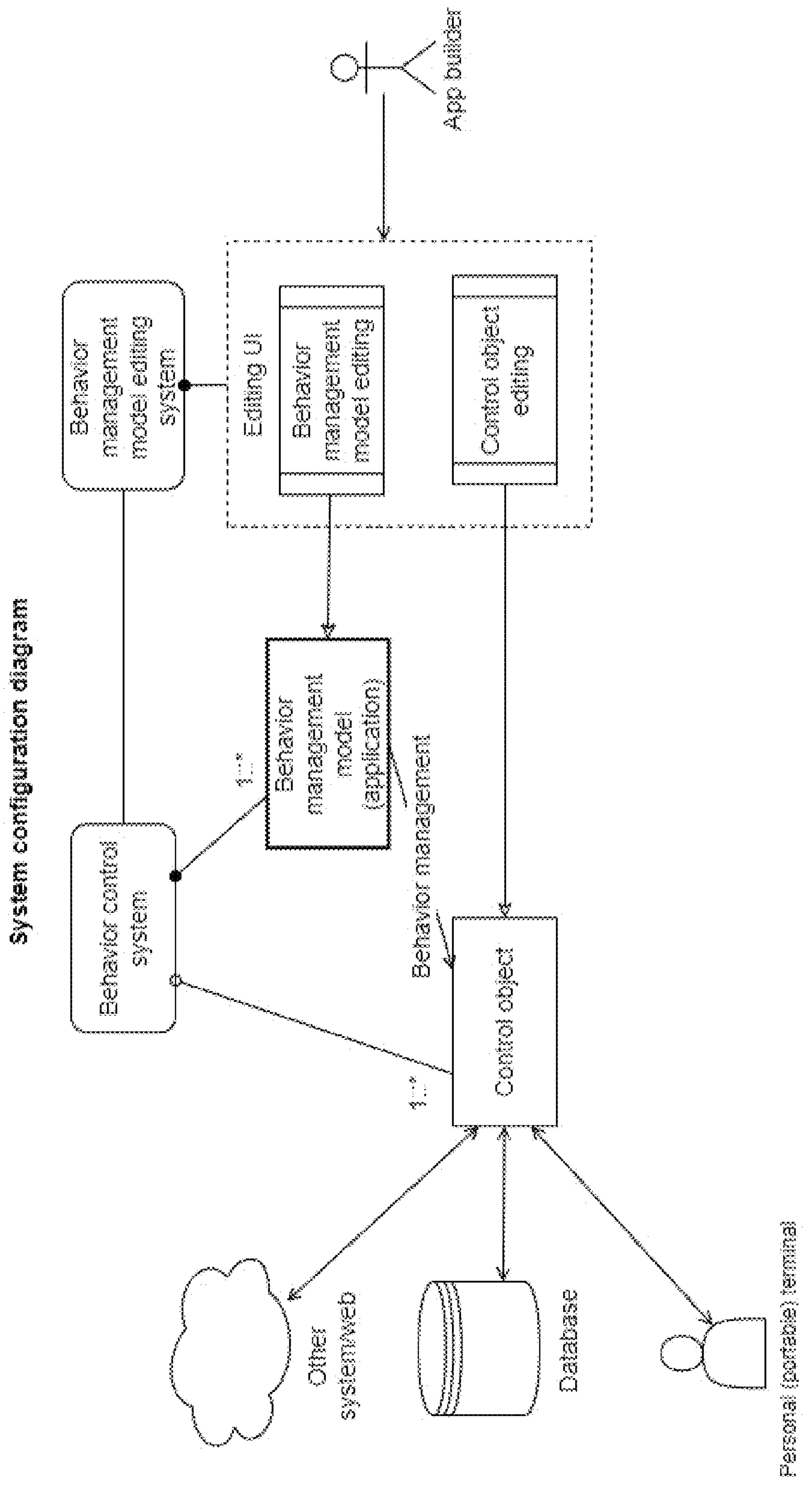
FIG. 1 A system configuration diagram

While the system configuration diagram according to FIG. 1 being referred to, an overview of a configuration of the basic model according to the present invention is explained.

This system is a system in which by categorizing classes of program objects in accordance with functionalities of and type information on return values and arguments of methods, and associating, instead of putting those in a simple call relationship, classes or instances with group objects having functionalities corresponding to object categories, programming or maintenance of a system is allowed to be carried out flexibly. This allows each processing to be handled not as definition of call relationship but placement in a certain group or position, and allows elements to be easily updated and replaced. Further, for example, it generalizes and simplifies, in a GUI, a processing definition in the case where a user definition portion is carried out in an event of putting an iconized object into a grid or a box, and makes it easy to configure a user editing screen from an API and so on.

This category object is optimal as a system and editing method (API) to assemble, in a GUI, a web system application by which, especially, determination of timing and targets of distribution to portable terminals for which it is important that telecommunication timing be controlled and that distribution targets be managed, acquisition, linkage, and distribution of status information about a related web system, and reception and transmission of other asynchronous signals are carried out in appropriate timing and services are provided just as intended by a system administrator. This is why an object categorized in accordance with input/output functionality is called a control object, here. Additionally, a method of adjusting each behavior of the control objects is referred to as behavior management.

The behavior management realizes a control object taking charge of each functionality through assembling it structurally. A model and structure of an application thereof are called a behavior management model. The control objects exchange control information mutually in accordance with a behavior management model corresponding to each of their purposes, store worth and the control information, remain for a given period, and communicate with and control portable terminals and another web system.

Categories are defined on the basis of specifications related to interfaces such as placer categories of control objects and those of placement groups, and can be defined for mutual correspondence relationships therebetween. By using inheritance on the basis thereof, category prototypes of the control objects and priority processing request/processing sequence transition functionalities thereof are allowed to be defined through being made to correspond with each other, and by combining such category prototypes freely, category designing of the control objects is allowed to be made.

System configuration: This system configuration is made of a behavior control system to carry out behavior management of control objects and a behavior management model editing system to edit a behavior management model. The behavior control system has and executes a control object to take charge of linkage with terminals, databases, and other systems, and a behavior management model to integrate them in terms of functionality, whereas the behavior management model editing system has an editing UI to state functionality detail of those objects and provides users with statement functionality of the behavior management model and the control object.

This system has the following characteristics.

1: Each control object has input/output functionality (ports) accompanying control of timing (that of standby, event/trigger wait reception or interrupts).

2: Control objects are defined and categorized by a group of input/output ports categorized in accordance with type and functionality.

3: Control objects are associated with a placement group and subjected to behavior management. Placement group objects are defined on the basis of category information on objects which can be associated. Such definition may go so far as to have numerical range information.

4: Although control object categories can have inheritance relationship, inheriting categories need to inherit input/output functionality from inheritance source.

5: Placement groups can have processing sequence transition functionality and priority processing request functionality in order to build a behavior management model. Control objects associated by using two types of functionalities are dynamically managed on the basis of information on a response to a system and on timing thereof. Additionally, by setting groups to be indefinite, objects to be placed are allowed to be also dynamically placed.

Behavior management of control objects allows the following to be carried out.

- To control an execution order and an execution target, for a control object process
- To control timing of interrupts, for a control object process
- To optimize a series of control object processes called by signals and responses
- To call shared utility/exception processing
- To exchange information appropriately between control objects
- To clarify processes allowed to be placed (to manage placement/association patterns)

An object to be stated or placed with an editor (a control object and a placement group) is called a statement class while a requirement in which a statement class is subjected to an accordance check in order to work is called a category. An individual processing process generated in accordance with a statement class on the occasion of working is called a (processing) instance. Unlike an object instance concept at a level of implementation, this is a concept to mean storage of worth and limitation on processing targets, necessary for individual processing.

Figure 2:
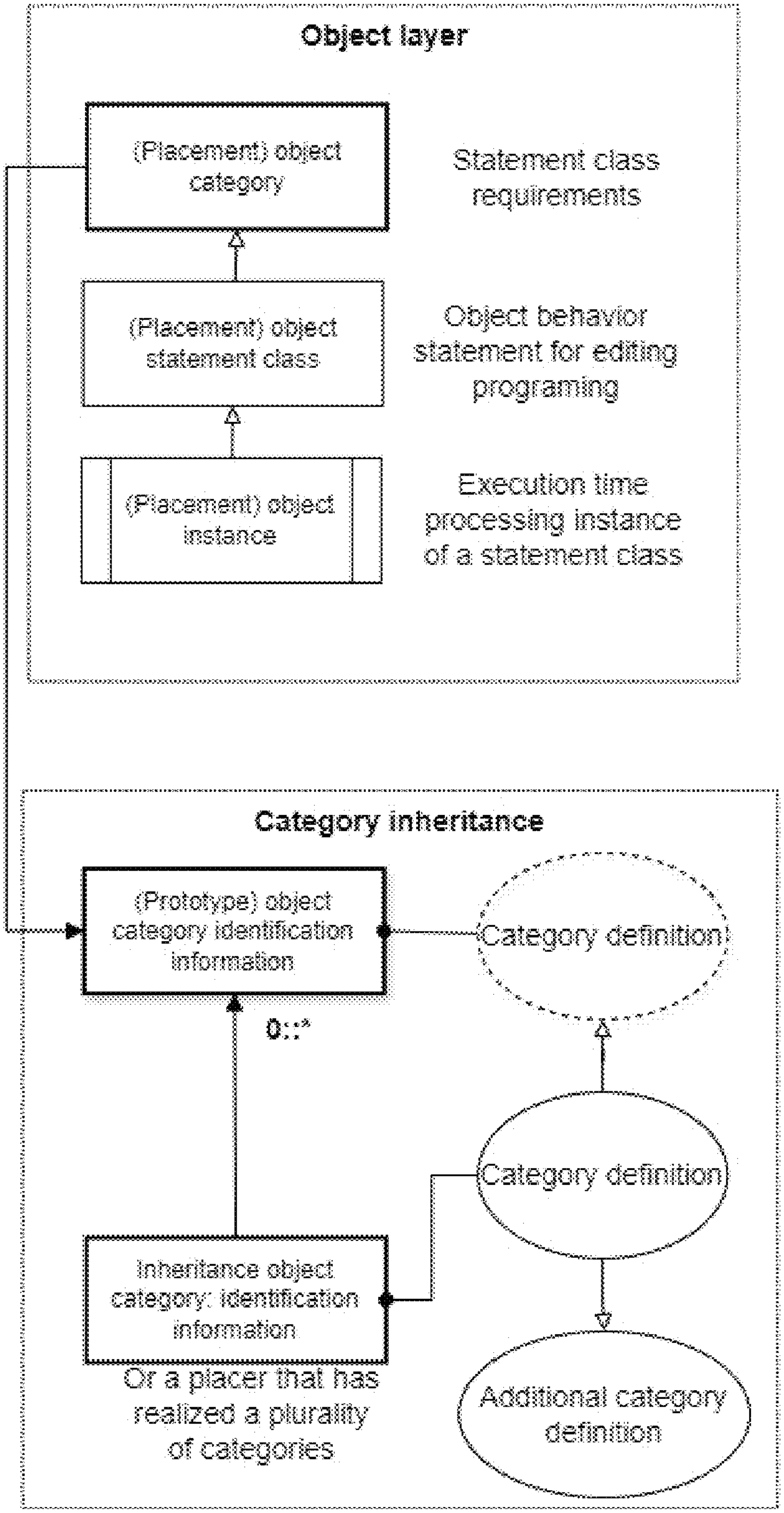
FIG. 2 A diagram to show an object layer (including a diagram to show category inheritance)

FIG. 2 is a diagram to show an object layer.

<<Object Class Model>>

Figure 3:
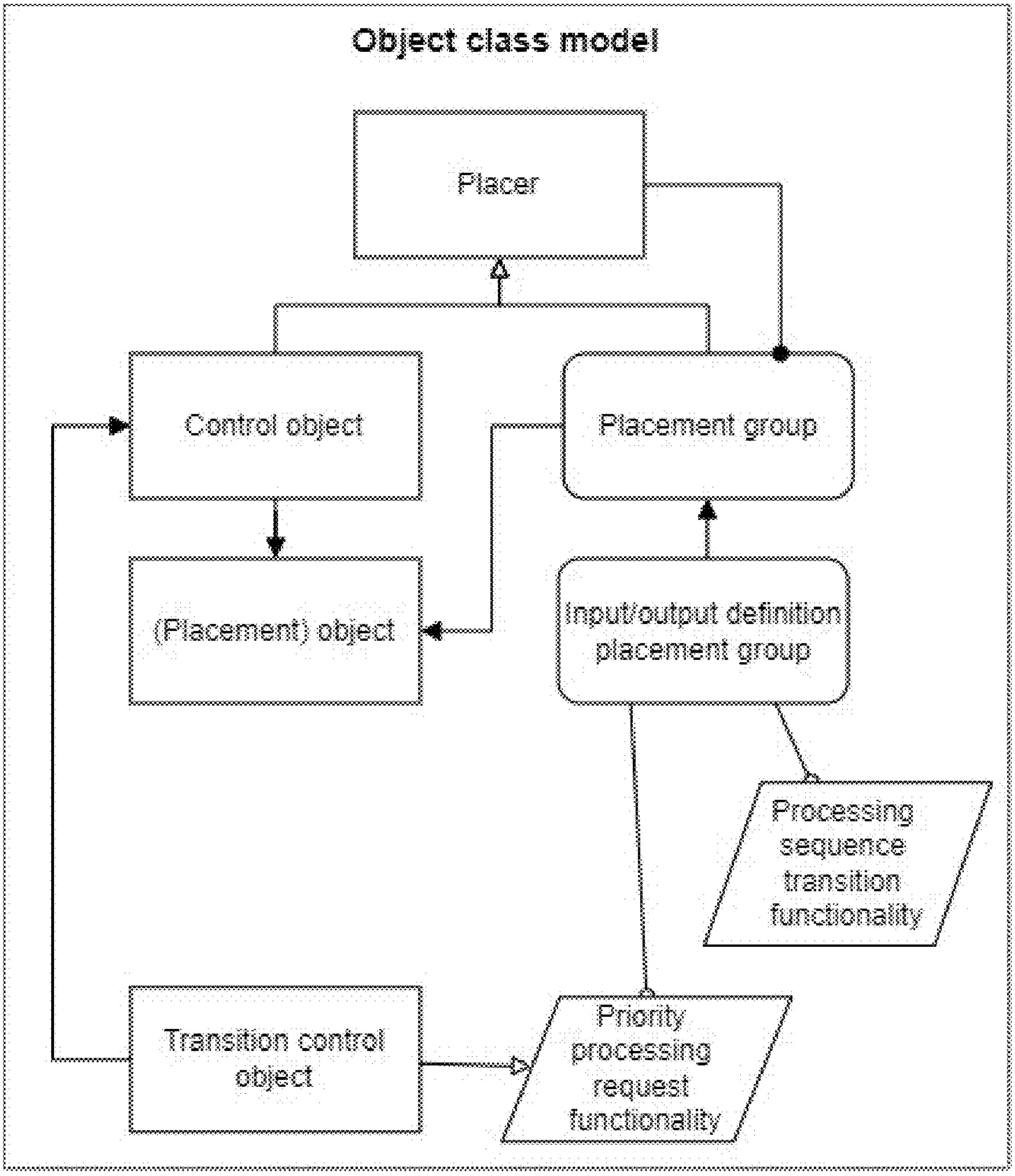
FIG. 3 A diagram to show an object class model

FIG. 3 is a diagram to show an object class model. FIG. 3 shows relationship between objects used. (Placement) objects are grossly divided into control objects and placement groups, both of which can be associated with a placement group as a placer. Input/output definition placement groups, out of placement groups, can realize priority processing request functionality and processing sequence transition functionality. Transition control objects are required in order to execute priority processing request functionality.

Control objects: Objects having worth storage functionality, calculation processing functionality, timing control functionality, and/or functionalities of input to/output from the outside. Ones having functionality of, especially, distribution to and reception from portable terminals, on-site devices, other web services are expected. Interaction between these control objects can be carried out through a method and input/output interface identified in accordance with type and functionality. This is referred to as a port and is called by a descriptive API or GUI. All exchanges of matters such as information on initiation, termination, instance generation, deletion, and timing, and information on numerical values, character strings, and pointers are carried out by this.

Control objects have category information. Categories are determined in accordance with contents to be processed while identification is carried out on the basis of category information on category classes including inheritance relationships and on essential ports that they should have (Control objects of such categories are required to have category essential ports).

Ports are identified on the basis of category information on control object ports on which contents to be processed are reflected and information type information thereon.

Although instance management for control objects varies from system to system, it is also allowable that priority processing request/processing sequence transition functionality have instance management functionality.

(In an event management system, standardized modules and scenarios correspond thereto.)

A "control object model" that schematizes the abovementioned functionality is illustrated.

Figure 4:
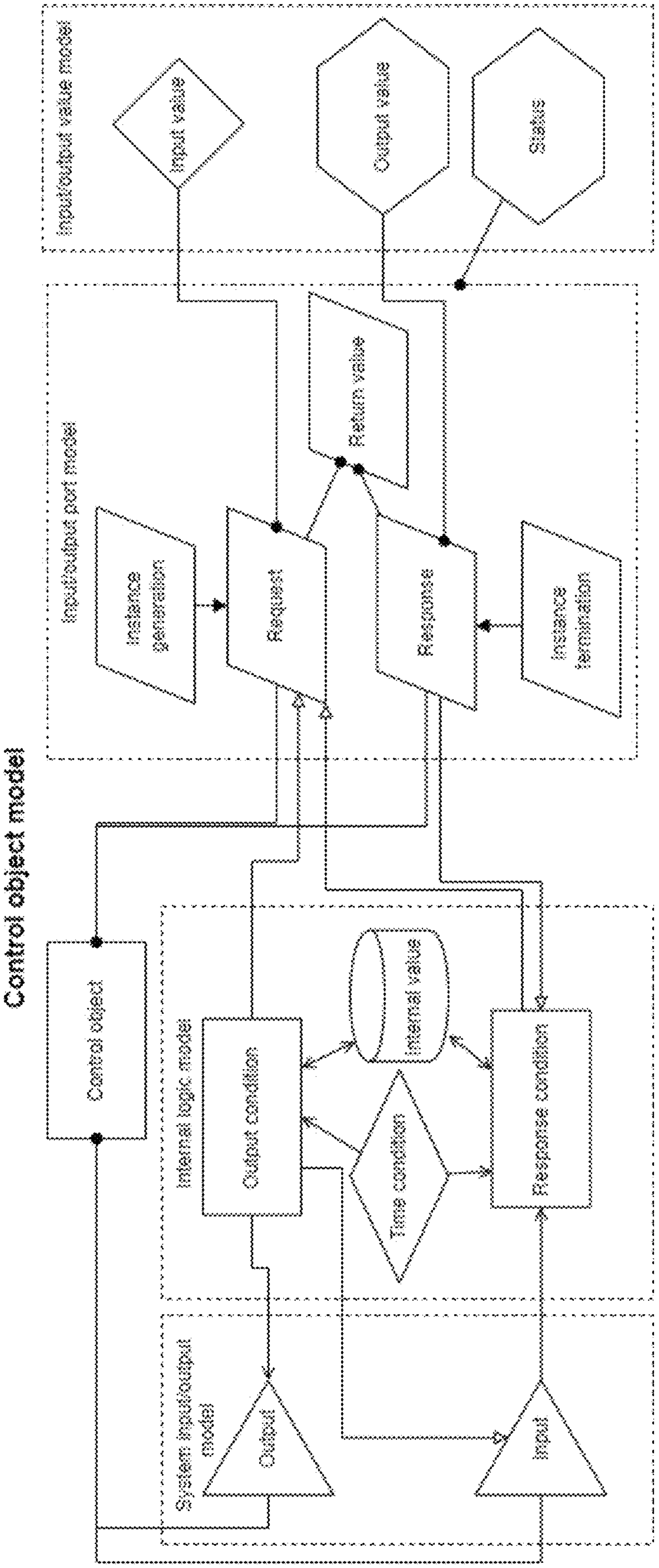
FIG. 4 A diagram to show a control object model

FIG. 4 is a diagram to show a control object model.

The control object model is configured from an input/output value model, an input/output port model, an internal logic model, and a system input/output model. Input/output ports that manage transitions from and to placement objects in addition to those from and to control objects are configured from an input port (instance generation, request) to receive an input value and an output port (response, instance termination) to send an output value. The input/output values have type information. An eliminator that terminates an instance and instance generation in which to generate an instance in response to a generation input has a functionality of terminating instance generation, besides its basic port functionality. A return value port is a concept resulting from putting together a response and request related to each other. In some case, each input/output has its status information. This includes a processing sequence context, a termination status, member scope information, evaluation time information, and so on.

On the other hand, the system input/output model handles a matter such as terminal input/output, information on input from/output to a database and another system, and output to terminals and so on. Information is processed and exchanged in accordance with a protocol shared with a target. An internal logic carries out calculation of a condition and timing for a response and those for an output, and output information on the basis of input/output information. A logic is configured through using an internal value, time conditions such as present time information, a request input, and input information.

Input/output ports: Specification in which to abstract an accommodation destination of arguments and return values of methods, a notification of event occurrence, intake and discharge of objects, and so on. Information and values whose types are distinguished on the basis of and accord with information types and categorized identification information (which guarantees functionalities) can be exchanged. It is also allowable to give information on evaluation time and instance identification and other meta information. Each category can have properties on whether correspondence relationship between an output port and an input port is one-to one or is allowed to be multiple (correspondence available range). An integer range of being one or more is also allowable. An input port that accepts a plurality of inputs accepts, each time an output port corresponding thereto has an event occurring, a transition, and the output ports make transitions to input ports corresponding thereto, all at once.

An input port, when an output port whose correspondence thereto is defined have an output event occurring, receives a value to generate a control object instance or receives it in a specified instance to remove a standby state. It depends on (categories of) ports whether or not the inputs generate instances.

Output ports carry out output in its unique timing through an internal process of a control object. Additionally, some of them do so together with carrying out processing for terminating instances. If they have input ports corresponding thereto, they receive and pass values, and generate partner control objects or remove wait reception. For this, it is necessary to specify corresponding instances or groups of such instances. Some output ports are expected to act to return values in response to requests. Although corresponding wait reception input ports are present in this case, they are handled in unity with output ports in the following statement (In the case where they are distinguished in particular, they are called return value ports).

Transition between an output port and an input port is defined in two methods, in one of which it is directly defined between ports of a (input/output port definition) placer statement class and in the other of which it is defined in category by using processing sequence transition functionality. Activation of output having no correspondence relationship is passed by.

Information to be exchanged: port identification information, type, value, evaluation time, (instance) identification information In some cases, instance identification information is not only identification information but a processing sequence context.

(Instance) generation input port: An input port to generate a control object instance.

Return value port: Await reception input port corresponding thereto is present. In this case, instance identification information on an output destination is generated on the basis of instance identification information received.

Status return value port: A return value port to return status information defined for each category by priority processing request functionality. The return value port defined as such is returned as a status array based on real placement information.

Direct definition: An output port of a certain (input/output port definition) placer and an input port of the certain (input/output port definition) placer are specified. The (input/output port definition) placer can be defined on any level (placement group category, placement group statement class, control object category, and control object statement class) and, if instance identification can be carried out, on instances.

Transition is carried out to a target to be provided with instance identification information or all instances made to fall thereunder by statements.

Output placer: output port, input placer, input port, <Instance identification information>

Figure 5:
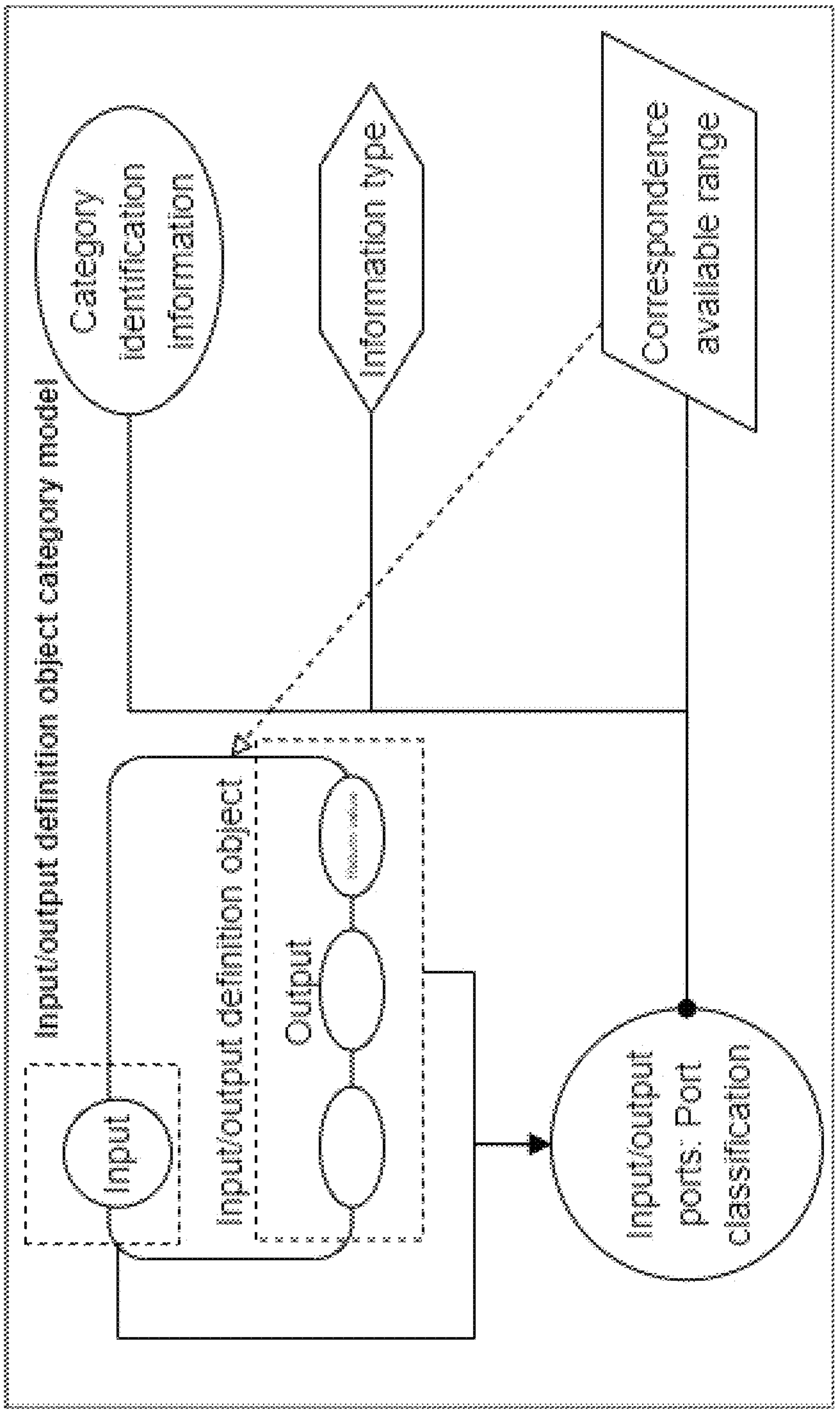
FIG. 5 A diagram to show an input/output definition object category model

FIG. 5 is a diagram to show an input/output definition object category model.

FIG. 5 shows an input/output port model. An input/output definition object can have a category port placed and has a port classification. The port classification is similar to a type stated in an input/output port model of a control object model diagram, and category identification information, information type, and correspondence available-range information are provided.

Instance scope of transition: In the case where a certain transition is defined between an input port and an output port, a target and mode of an input destination is defined when an output port of a placer instance having such definition is activated. Transition varies in accordance with whether or not a processing sequence context to be described later is present.

1: Contextless Transition

A) Generating input: One contextless instance having a statement class to be a target in identification information on identification groups is generated for each statement class.

B) Non-generating input: A placer instance to be a target in identification information on identification group instances 2: Context-Present Transition A) Generating input: One instance having a statement class to be a target in identification information on identification groups and having the context is generated for each statement class.

B) Non-generating input where sequences are specified to be identical in type: A placer instance to be a target in identification information on identification group instances and having the context C) Non-generating input where no sequence is specified: A placer instance to be a target in identification information on identification group instances Placement group: A placement group statement class is defined as a union set of category sets of a placer statement class (placed dynamically in some cases).

A placement group object acts to associate a control object and another placement group object with each other, and manage and control them (placer). It is defined in accordance with which category the placer is of and (what quantitative range) it is associated in. In the case where it is defined as a placer, it is essential for itself to have a category, too. It is also allowable to determine numerical range conditions by summing up several categories.

Additionally, it is also defined in accordance with which of processing sequence transition functionality and priority processing request functionality to be described later it has or whether it has both. In addition, information on belonging to a placement group is used also as a condition for extracting a priority processing target in an identification group.

Instances of a placement group are generated by a group instance generation input and associate placer instances generated in accordance with the definition.

Placer: A placer refers to a control object associated with a placement group, or a placement group. The placer is a statement class and when it works, it generates an instance in response to a generation input.

A placer to be finally extracted as a real placement placer turns out to be a control object whose input/output ports are defined or an input/output port definition placement group.

Real placement information: Identification information on placers associated with a placement group at a specific time and on their relatedness, and other placement group information associated with the placers. For a priority processing request to be carried out, instance information on the placers needs to be added. It is also allowable to receive and pass only placers (provided with specific input/output ports) to be an identification group processing target of specific input/output ports by filtering them. The placers have unique and/or relatedness identification information.

Figure 6:
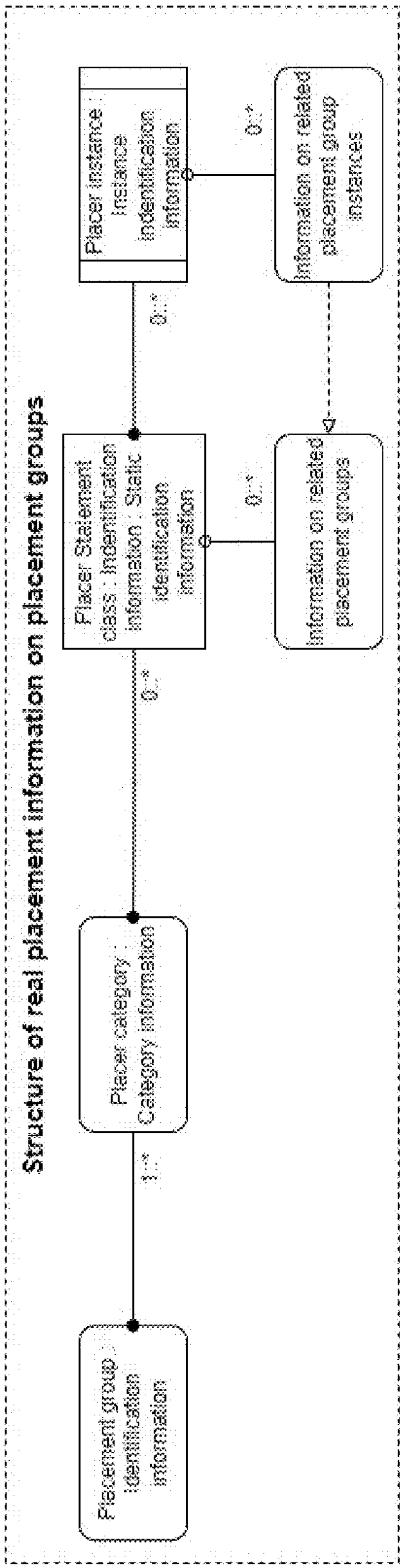
FIG. 6 A diagram to show a structure of real placement information on placement groups FIG. 7 A diagram to show an example of real placement information on input/output port definition placement groups (including a diagram to show an identification information model)

FIG. 6 is a diagram to show a structure of real placement information on placement groups.

FIG. 6 shows a structure of real placement information. The real placement information consists of placer category information, statement class information included therein, and placer instance information generated therefrom. Further, for information on and instances of a placement group related thereto, group instance information is present.

Figure 7:
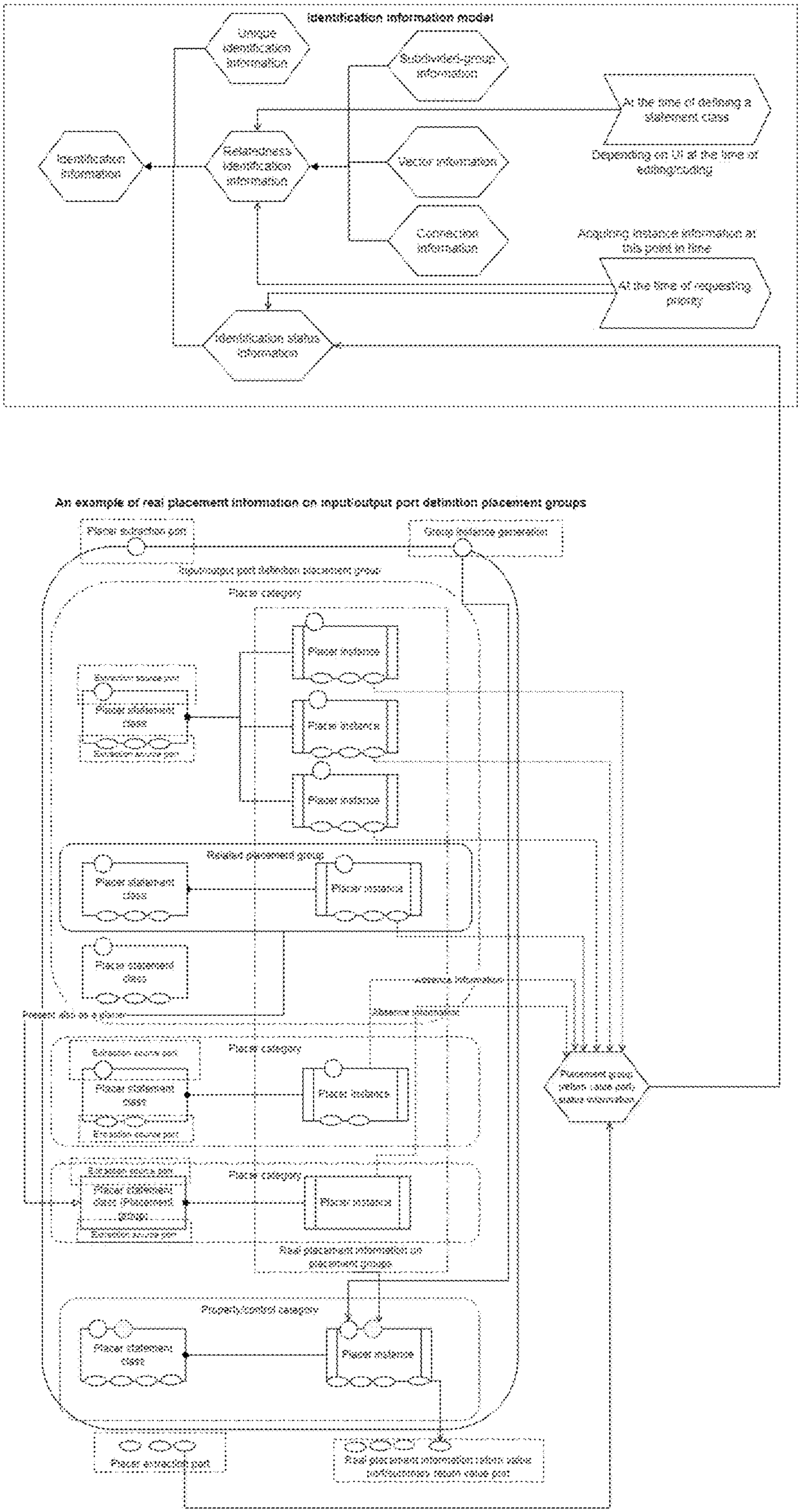

FIG. 7 is a diagram to show an example of real placement information on input/output port definition placement groups.

FIG. 7 shows a real example of real placement information, and information on input/output ports.

Specification of a final identification placer: Although a placement group and a control object can accord with a placer, it can be determined whether or not to include a group as real placement information to be finally picked out (It can be whether or not input/output ports are defined). Additionally, it is also allowable to regard a relationship between groups only or that between placers as information structured by groups, to specify depth of a layered structure of a corresponding identification group. It is also allowable that this property can be specified on a transition control object side. In addition, it is also allowable to specify a category to be excluded from the real placement information (ex. placer for the property).

Input/output port definition placement group: It is also allowable to define an input/output port in a group object in order to handle inputs/outputs to a group as a functionality. That is called a placer extraction port. An input having instance identification information as a basic functionality is inputted to an identical category input port of a corresponding instance. A corresponding extraction output port is said to output any output of an identical category output port. A method of processing inputs/outputs having no instance identification information needs to be determined.

Additionally, that is a return value port to return real placement information at a time of request. In some cases, a real placement information return value port is present.

Priority processing object request functionality is targeted for an input/output definition group having a real placement return value port.

Placer extraction port: Although a product set or union set of port categories of all placers in a placement group is, basically, specified as a port of the group (categorical aggregation type), it is also allowable to make an identifier obtained by summing up all ports of placers and adding placement information thereto be a port of an allocation identification group (addition type). This is used at such a time as that of setting a placer for properties such as a case where an identification group has processing sequence transition functionality and a case where property information on group objects is necessary. An input/output port of a placement group defined this way on the basis of information on input/output ports of an internal placer is called an extraction input/output port.

On the occasion of category definition, an essential port category is specified out of these pieces of extracted port information and made to be an essential port.

It is also allowable to specify some of the categories to be addition-type ones and make the others be categorical aggregation-type ones.

As for a non-identification port definition group, when an output port of a placer is activated, an output port of a group corresponding thereto is activated, and when a group input port has a input having no identification information, inputs are carried out on corresponding ports of all placers inside.

Identical-type port summarization: It is also possible that a plurality of port categories identical in information type is summarized into one new port category and redefined as input/output port categories of a placement group. In this case, it is also possible to add an identifier (such as a subgroup) that reflects the summarization information, to the relatedness identification information of category placers to be summarized. This allows ports working likewise and belonging to different placer category inheritance sequences, to be unified.

Property Category: A property (control object) category can be added to placer categories in order to implement attributes and a special aggregation processing functionality for a group. It has an instance management including group instance generation (input of group instance generation/deletion), real placement information acquisition input port (special category), and has, by category definition, a return value port for aggregation.

Dynamic placer association: In the case of a type of service in which placement of control objects is determined interactively with users or an environment, it is also allowable that association (placer placement process) is carried out at the time of requesting priority processing. In this case, an API for obtaining a list of placement candidate control objects is specified, at the time of editing, as placement information on placer categories. A placer placement process is carried out on the outputted list information and a real-placement control object is determined thereby.

Priority processing request functionality: The priority processing request functionality is a functionality of determining, when an extraction input/output port of a group and an output category port of another object lie in a transition relationship with each other, which placers in a group of placers in which to implement an input/output category port thereof an actual transition should be made between. A placement group to be a target is called an identification group. This group has a real placement information return value port and a status return value port (list) required by its functionality. Also, a transition control object (action) that carries out priority processing is required.

Even definition only at the time of input or only at the time of output is allowable.

Definitions in an actual statement class are made either by direct definition or by processing sequence transition definition (subject to category accordance checks with respect to both).

By providing the associated placement group with identification information on each placer, relatedness identification information (real placement information), and status information on internal instances necessary for priority processing, transition calculation is, on the basis of that information, and priority processing request input/output information and reference placement group information from input/output ports to be a trigger, made in a transition control object with regard to which instance's target ports within an identification group should be made to input priority processing request input information or priority processing request output information should be outputted to.

Identification groups and reference placement groups need to be input/output port definition placement groups.

Figure 8:
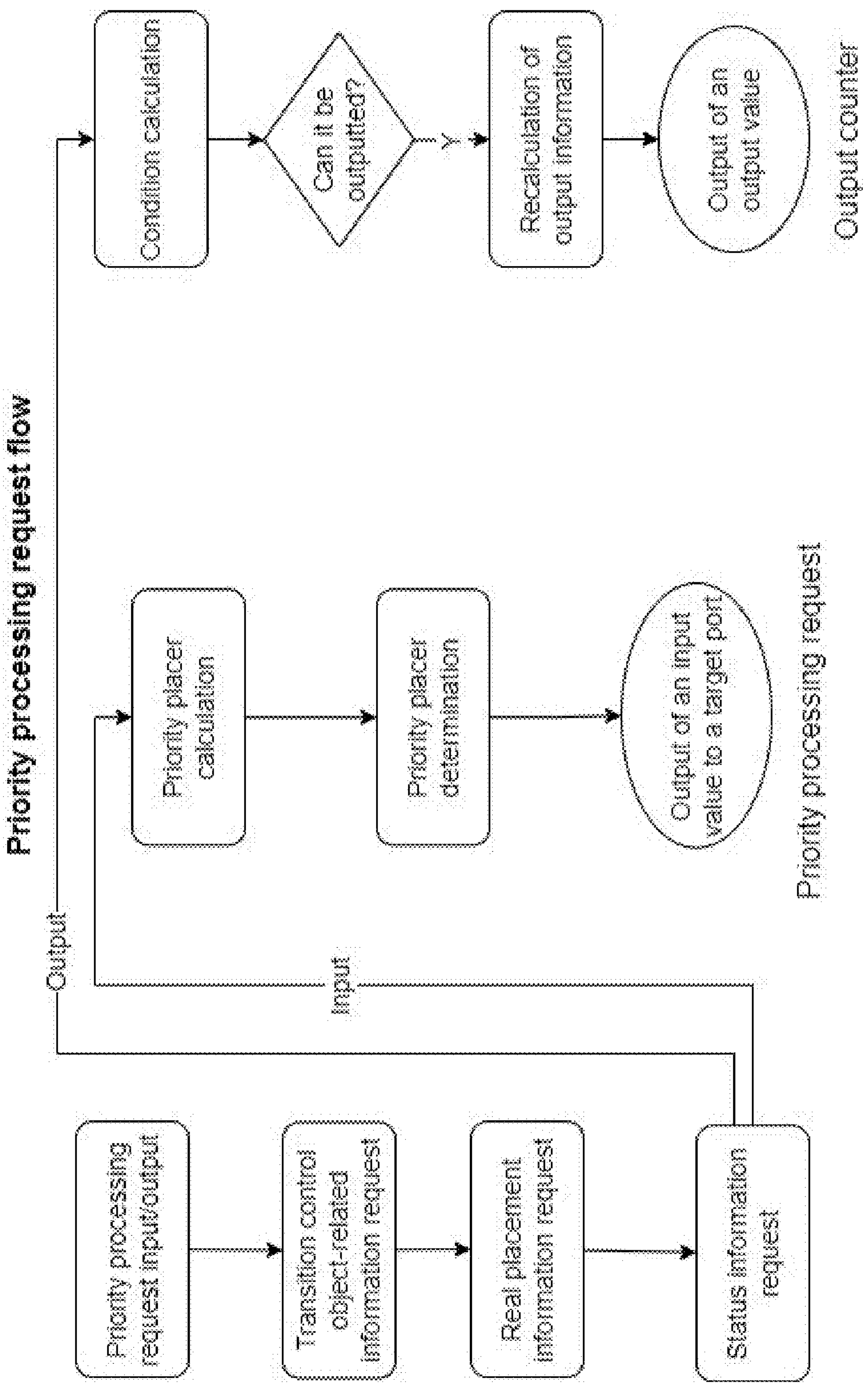
FIG. 8 A diagram to show a priority processing request flow

FIG. 8 is a diagram to show a priority processing request flow.

FIG. 8 illustrates a flow of processing a priority processing request.

1: A priority processing request input/output is made to a transition control object as well as transition source status information.

2: Control value information or the like of the transition control object is called by a transition control object-related information request.

3: Real placement information on an identification group and a reference placement group is called by a real placement information request.

4: By requesting status information, requested status information (specifying a port) out of that on placers or groups of an identification group or a reference placement group is called.

Here, the flow diverges into input and output.

Input 1: Priority degrees of transition destination instances within an identification group is calculated on the basis of the above information through priority placer calculation.

Input 2: By determining a priority placer, a target placer instance (set) is determined through calculating conditions such as a threshold value, and unique identification information is added to output information.

Input 3: An input value is outputted to a group target port, and input processing is carried out to a corresponding port thereto of a target placer determined on the basis of the unique identification information.

Output 1: evaluation on whether or not the input can be outputted is made on the basis of condition calculation.

Output 2: If it can be, it is determined to be outputted.

Output 3: It has its output information or status information modified by recalculating the output information.

Output 4: It is outputted from a transition control object.

Figure 9:
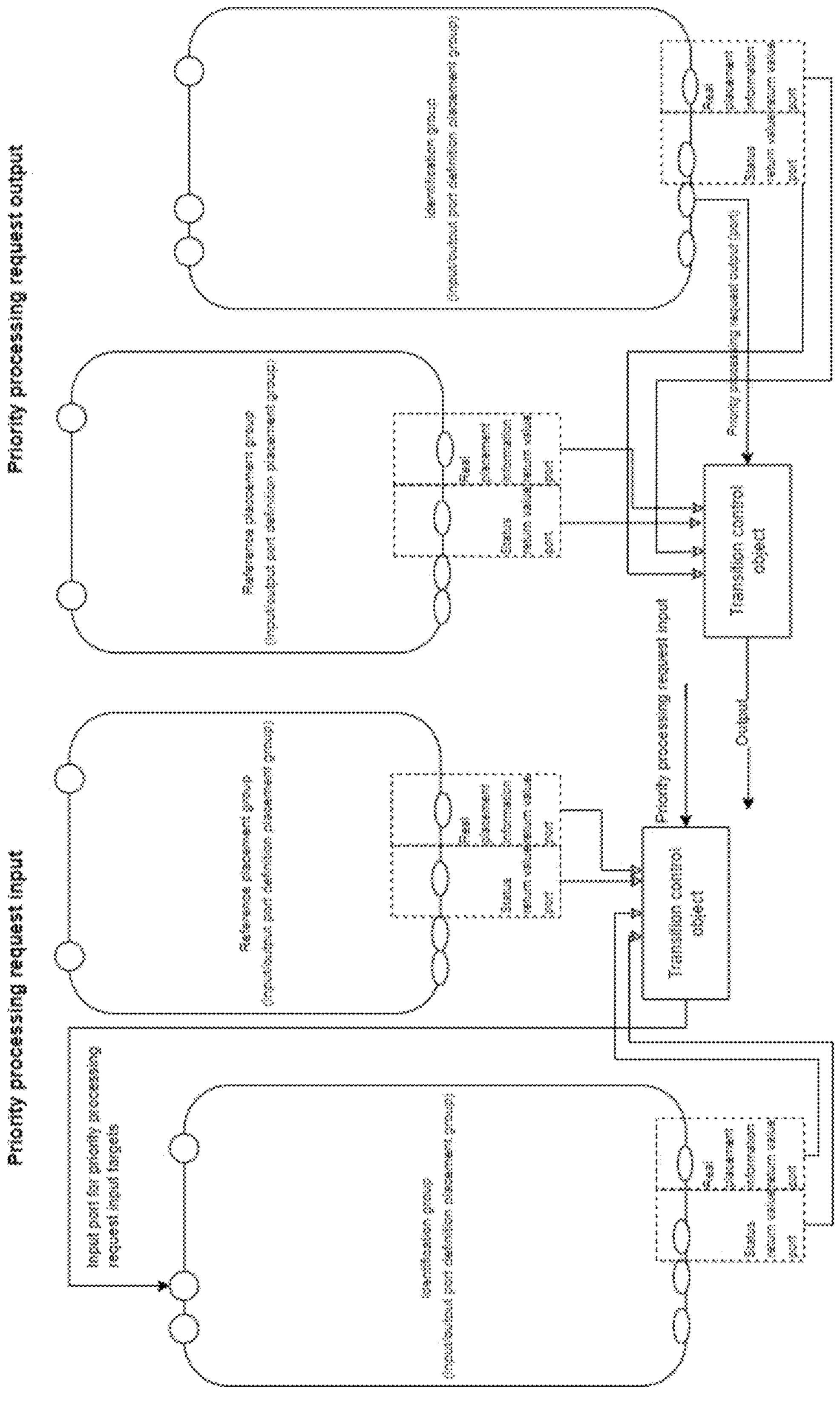
FIG. 9 A diagram to show a priority processing request output and a priority processing request input FIG. 10 A diagram to show a processing sequence transition definition behavior FIG. 11 A diagram to show a processing sequence transition functionality model FIG. 12 A diagram to show a flow model of transitions between placement groups FIG. 13 A diagram to show a property model to check on placer accordance FIG. 14 A diagram to show an example of placing, in a GUI, control objects in a placement group FIG. 15 A diagram to show relatedness between objects in a prototype widening model FIG. 16 A diagram to show category definition FIG. 17 A diagram to show statement class generation FIG. 18 A diagram to show an example of intra-box placement FIG. 19 A diagram to show how categories of placers are modeled in a prototype element FIG. 20 A diagram to show how an evaluation step and a scenario structure are modeled FIG. 21 A diagram to show a module connection pattern FIG. 22 An object relatedness diagram of a grid model, Table allocation diagram A, and Table allocation diagram B FIG. 23 A matrix placement diagram FIG. 24 A diagram to describe how a business user and an end user are positioned with each other in the computer system according to the present invention FIG. 25 A diagram to show how the computer system according to the present invention is configured inside a server

FIG. 9 is a diagram to show a priority processing request output and a priority processing request input. Priority processing request input: It is generated when a priority processing request input is received from an output port of another object, and determines a placer instance that receives the input or a set of the placer instances.

Priority processing request output: When an output port is used, it is carried out when an internal placer output occurs, and it works as an output counter. The output counter referred to here is a functionality of recalculating output contents by determining conditions on whether output should be transitioned to a partner-side input port each time an internal output is generated.

If input/output ports of an identification group have a transition control object functionality as a functionality of a group object, an identification method is specified by the Property and normal transition information is received. If it has no transition control object functionality, it receives real placement information and identification status information to be returned in response to a priority processing request before that, and sends the information to a placer input port corresponding thereto.

Processing sequence transition functionality: A processing sequence transition functionality is a placement group in which at least one set of transition definitions between input/output ports of allowable placer categories of several input/output port definition placement group categories is defined. A functionality of giving information for matching an output and input of essential port information on placer categories within a placement group and providing the placement group with a cooperation functionality of a control object to make process control to be carried out. A transition relationship is defined between an output port (category) and input port (category) of one or more set of placer categories, and when an output corresponding thereto is activated, an input is carried out to an input port of a category specified in accordance with a processing sequence context. It is also possible to define only an input port for managing a processing context. In this case, any one output of an existing placer is required to have a transition definition.

In a transition definition, two properties being context generation management and multiple context acceptance can be set. Additionally, it is also allowable to specify a non-generating input to be identical in type.

Although it is also allowable that in a category, a plurality of placers is placed, the category is, in this case, made to have a priority processing object request functionality. It is also allowable that a category transitions to itself (if it does so in a correspondence relationship from its output port to its input one). A single control object or an identification group is placed in a placement category.

A correspondence relationship between an input and an output in a placer, resulting from the above definitions (wherein all inputs and outputs defined are connected) is called an intra-placer transition definition. It is not defined explicitly but is automatically configured from a transition definition.

As a result, in a processing sequence transition definition, one or more series of effective connected graphs are formed through an input or output port with a context generation specification, a transition definition subsequent thereto, and the intra-placer transition definition.

Additionally, it is also possible to realize this functionality in a placement group. Placement object information is extracted from the transition definition and is defined as a placement group with a numerical range of 1:1 as a placer category. This is called a processing group.

In a placer placed in a processing group, a processing sequence transition is automatically defined between category ports of the placer.

Processing sequence context: In the case where processing has been initiated in a processing sequence, a processing sequence context is issued when an input/output port with its transition definition specified is evaluated in order to ensure integrity of a series of transition processing. Once the processing sequence context is issued, it is inherited by following a transition definition of a processing sequence transition to which it belongs and an intra-placer transition definition. On this occasion, other (processing sequence) transition definitions that overlap in definition are basically passed by. The processing is carried out by using a placer instance generated by a generation input having a context as a processing target and by using, if there is none, an instance having an intra-placer transition definition of a processing sequence corresponding thereto. Even if a transition going beyond its transition sequence is once carried out, its context is maintained, and in the case where it has transitioned to an input definition of an identical processing sequence context, the context is inherited. It disappears when a port to receive an elimination specification is evaluated as a context generation management port.

Transition Detail for Each Transition Definition

1: Output from instance generation input: Output in that placer instance context.

2: Output from request input (Identical context generation placer): Output in that placer instance context.

3: Output from request input (non-identical context placer): The requirement is that in an implementation, processing sequence context transitions correspond one-to-one on a level of practical use (Identification information, timing order management, etc.). A required specification of a control object category. Actually, processing can be carried out in an instance having a global variable. A matter such as making, to an identification group, a priority processing request subjected to processing sequence definition.

4: Instance generation input from output: One instance having a statement class to be a target in identification information on identification groups and having the context is generated for each statement class.

5: Request input from output (Identical context generation placer): A placer instance to be a target in identification information on identification group instances and having the context 6: Request input from output (non-identical context placer): A placer instance to be a target in identification information on identification group instances. If it is specified to be identical in type, no transition occurs.

7: Input where a non-definition transition is defined: If a context in the processing sequence transition definition is present, processing is carried out as in 1-3.

8: Non-definition output having a context: Although the context is retained, it does not affect a mode target of transition.

9: Transition definition neither having a context nor specified to generate a context: It shall be passed by.

Figure 10:
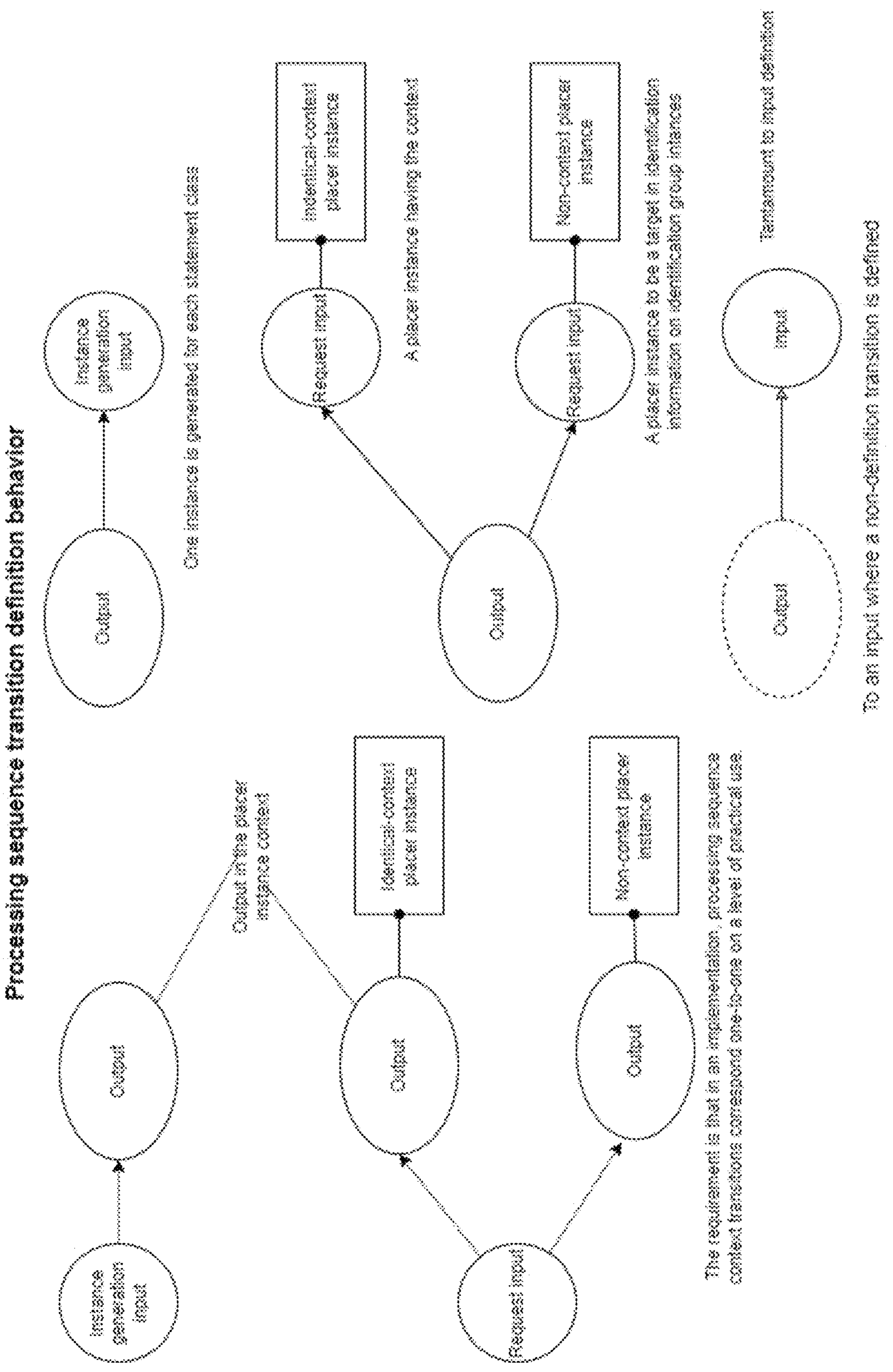

FIG. 10 illustrates the above relationship. FIG. 10 is a diagram to show a processing sequence transition definition behavior.

Context generation management specification: For the context generation management specification, two modes being those of generation and of elimination can be specified. When generation specification is set and a transition that does not have, for that, a context of a processing sequence transition definition is evaluated, a processing sequence context is generated.

It is eliminated when elimination specification is made and a transition that has, for that, a context of a processing sequence transition definition is evaluated.

It is also allowable that the generation is made to be simply effective only within an effective connected graph.

Multiple context acceptance: In the case where in a transition definition having such specification made, generation and inheritance of another context is carried out, it is accepted. One evaluation can have multiple contexts, and transitions are made for each context in accordance with allowable transition modes in the above 1 to 9.

Figure 11:
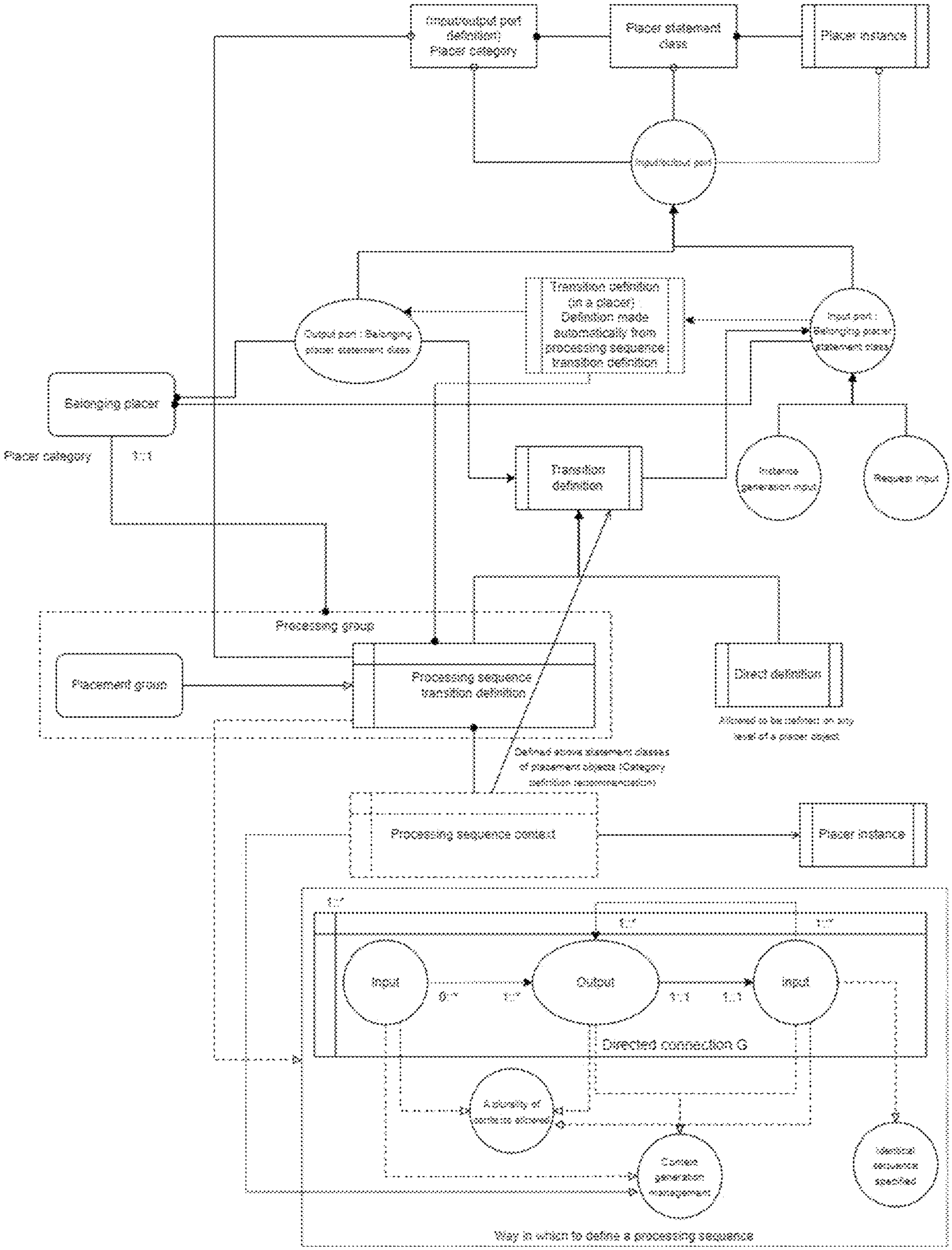

FIG. 11 is a diagram to show a processing sequence transition functionality model.

FIG. 11 illustrates a relationship in the whole of a processing sequence transition functionality.

Input and output ports to be subjected to transition definition have belonging placer (category) information and are divided into request inputs and instance generation inputs for the input ports. Once the transition definition is explicitly made between ports, an intra-placer transition definition is automatically defined if an input port and output port for which transition definitions identical in processing sequence are made are present in an identical placer. These transition definitions are definitions in a category if a processing group category is defined. A processing group is a placement group in which a placer that carries out processing sequence transition is defined as a category placer, and only one statement class placer can be taken for each placer category.

A processing sequence context is generated when transition is realized in that instance. A set of directed connected graphs by explicit transition definitions and intra-placer transition definitions that make up a processing sequence transition definition constitutes a processing sequence and is evaluated, but when, for that port, an evaluation for a port subjected to context generation management (generation) is made, a context is generated, and when a port subjected to context generation management (elimination) is evaluated, the context is eliminated. For each of the ports, multiple context acceptance and identical sequence specification can be specified as detailed properties.

Transition control object: A placer (or a control object) having a special specification for controlling input/output of an identification group can be defined. A transition control object has one or more input destination identification groups or control objects (a category list/an input destination object), and has one or more output source input/output port definition placement groups or control objects (a category list/an output source object). Additionally, it is also allowable to have an identification group or control object (a category list/a status object) for obtaining a control status.

When the transition control object receives output from any of the output source objects, it sends a priority processing request to the input destination object and the status object, acquires real placement information and status information, and sends an out output having status identification information attached, to the input destination object.

It is also possible to simply specify only an information type or a port category for either input destination or output source.

Additionally, it is allowable that in addition to category definition, a transition relationship between ports which is essential is defined. A transition relationship between a specific port of a certain category and its own port is handled as an essential transition.

Category: A placement group, a control object and a port have category information. The category information can have an inheritance relationship, and an inheritance category that inherits mandatory conditions of an inheritance source can be defined. A category that lacks its parent mandatory conditions is not considered as an inheritance. If the above conditions are satisfied, a category having a plurality of inheritance sources can be made. This allows a control object category having a necessary functionality to be defined by combining a control object prototype category corresponding to a priority processing request functionality category and that to a processing sequence transition functionality category. Additionally, at a definition time when a category needs to be unique, it is also possible to define inheritance categories that differ only in identification information and to identify a group of objects having different functionalities.

In the case where an inheritance category is asked to satisfy inheritance source category requirements, it is handled as doing so.

As for a functionality realized by inheriting the above category, an object can have a plurality of categories, and it is also allowable that if a matching category is present at the time of checking on category accordance, it is made to be accepted.

For category information that enters requirements at the time of inheritance, the inheritance may be carried out at the same time to change an identifier. Identical requirement categories are unified when inheritance is carried out from a plurality of classes and the requirements are unified. In the case where separation is desired, identifiers need to be separated from each other.

When an input/output port inherits a requirement category, a parent's essential input/output ports cannot be deleted. However, it is also possible to narrow down functionalities by stylizing as an exception, processing at the time of occurrence of transition, with properties. It is necessary to define the processing at the time of occurrence of transition for an input/output port specified to have its functionalities narrowed down. (It is also possible to provide prepared processing in advance as port properties by a system.) In the lower moiety of FIG. 2, a diagram showing category inheritance is drawn. FIG. 2 shows that an inheritance object category or an object can have a plurality of prototypes, and that for category inheritance, all prototype category definitions and additional definitions need to be satisfied.

Control object category: A control object category is defined by a functionality (identifier) and essential input/output port category information. One port category corresponds to one port. If a plurality of ports of an identical type is necessary, the port category should be inherited to define different categories. When a category is defined from existing control objects, essential ports need to be specified. Mandatory requirements: Category identifier, Port category (list), <Port property/inheritance time>

Port category: Defined by functionality (identifier), and by input/output functionality of ports, information type, and correspondence available range.

Mandatory requirements: Category identifier, Information type, Port classification, Correspondence available range Placement group category: A placement group category is defined by a control object category to which association can be set, a placement group category (placer category) and its allowable number of (instances), and other placement group category information that is allowed to be associated with that category. The allowable number is determined by a simple numerical range or an integer ratio (range) between categories as an allowance degree of statement class and number of instances.

The group definition conditions described above are called placement group category structure conditions.

Placement group categories are defined in the form of relatedness identification information in implementation specifications. Identifiers may be highly enhanced in functionality by two phases, in one of which identifiers are simply unique and in the other of which identifiers have position information (multidimensional vector information) for determining relative positions based on order information or a plurality of position scales, and subgroup information.

Input/output port definition placement groups: A placement group in which to implement input/output ports include a category definition based on a category placement count of input/output ports in the same way as control objects, for its definition content.

Priority processing request functionality category: Category definition comprises category identification information based on functionality, classification on whether a priority processing request is for output or input, priority processing request input/output information (input/output port category), available information on an identification group, available information on a reference placement group, and, if the identification group has no functionality, transition control object category information.

Processing sequence transition definitions and direct definitions are used in order to define transition details of statement classes as needed.

Target placement group category definition information: placer category, usage status return value port (list)

Category requirements: category identification information, type, (priority processing request) input/output port category, identification group category definition information (list), reference placement group category definition information (list)

<Transition Control Object Category>

Processing sequence transition functionality category: It has transition definition information between input/output ports of a placement object category (category transition information). A pair of category information on an output port and that on an input port is defined as needed. In the case where a plurality of placers of an identical type is necessary, different categories are defined by inheriting a port category.

Transition definition: Transition definition is made between an output port and input port which belong to a placer category of a processing group.

Output placement object category: Output port category, Input placement object category, Input port category, <Context generation specification>, <Multiple context acceptance>, <Identical sequence specification/Non-generating input>

Category requirement: Category identification information, Transition definition (list)

Transition Control Object Category

Mandatory requirements: category identifier, input destination object category (list), output source object (list), status object category (list), <category transition information (list)>

Category definition: Category definitions of control objects, placement groups, input/output ports, priority processing request functionality, and processing sequence transition functionality can be determined directly or by extracting conditions from existing objects.

Procedure for Category Definition

1: Specifying a category identifier. Determine a unique identifier in a value space to be used. Specify, if any, an inheritance source category. A plurality can be specified, but mandatory requirements for each thereof need to be inherited (Requirements for ones identical in type and category are unified).

2: Defining category mandatory requirements. Set the mandatory requirements. If an inheritance relationship is present, make definition in accordance therewith.

3: Checking on inheritance. If an inheritance relationship is present, check on whether it satisfies a condition thereof. If it satisfies that, it is defined as an inheritance category.

Category accordance check: Control objects, placement groups, priority processing request definition, and processing sequence transition definition are checked on whether their objects defined at the time of being specified in category or at the time of being placed accord in category. Accordance check is carried out on the basis of a statement class. Port categories are checked as a definition element for each of them.

1: A statement class (corresponding to an instance) is called.

2: Category information is extracted.

3. Category requirements are called.

4: Accordance checks on category requirements are carried out with the statement class.

Identification information: Information to be used for identifying a placer of an identification group is calculated on the basis of one or more of three types of information below. In the case where a certain placer has a plurality of instances, it is identified for each of the instances. Identification status information depends on instances, and in the case of identifying instances through priority processing object request functionality, that should be used. Additional identification information is added to relatedness identification information. Besides this, as a mechanism of identifying instances, control by a processing sequence context to be described later or by a member scope according to another invention is available.

1: Unique identification information: It occurs automatically by individual placers being associated with each other. Identification information unique to each placement is allotted. Final placer specifying information is a group of lists of or order information on this unique identification information. Instances also have unique identification information.

2: Relatedness identification information: Information on mutual relatedness between groups which is determined at the time of association. The relatedness identification information is finally summarized into the following vector information, or subgroup information, and connection information. Thus, order relationships and functionality distinctions are managed. Instances have identification information on relatedness to related object instances besides relatedness identification information on statement classes. Identification information, a processing sequence context, and so on about a member scope fall under that.

2-1: Vector information: A combination of order information is allotted in accordance with individual specifications at the time of definition. That is carried out by specifying properties for identifiers showing a positioning priority order in a lane order or a vector space, or doing the like.

2-2: Subgroup information: A combination of labels for classifying placers is allotted in accordance with individual specifications at the time of definition. That is carried out by specifying properties for identifiers and placing placers in a specific box, grid, and portion of a GUI.

2-3: Connection information: In the case where a placer is managed in accordance with a connection relationship with other placers, node-edge information of that connection turns out to be a framework of relative relationships within a group. Identification information turns out to be relative-position information reduced to a node or edge of a placed object. This holds for a case of being placed in a directory-structured branch or the like, or a case of defining a relationship by adding a node to a transition relationship, and so on.

3: Identification status information: Instance status information at the time of requesting priority processing for a transition source and a partner identification group. Dynamically changing status information such as processing time, current values of possessed attribute values, and real placement information and status information (current status) on activating sources. Information specified as an output port of identification status information of each placer is used.

Identification information is illustrated in a diagram of an identification information model (upper portion of FIG. 7). The identification information is divided into unique identification information, relatedness identification information, and identification status information, and the relatedness identification information is identified by vector information, subdivided-group information, and connection information. At the time of defining a statement class, the relatedness identification information is provided with identification information on the statement class, and at the time of requesting priority processing, is provided with instance identification information and identification status information on the relatedness identification information.

Priority processing request: In the case where transition is carried out to a placer of an identification group (to an input port), and in the case where instance identification information (list) on each of the placers is not given, a priority processing request is made and a placer instance (list) of a transition range is determined. An object for making this determination is called a priority processing transition control object. It is also allowable that this is managed as properties of a group object or as a placer thereof. (In that case, difference in port specification is described in a section of an identification group.) In the case of being managed as the properties, a placement step is handled as an internal process.

A) Placement Step

1: Accordance check on priority processing request categories. It is checked on whether related objects are placed as a processing sequence transition definition and whether a category of the related objects accords with category requirements at the time when transition is directly defined, that is, a transition relationship is established. In addition, it is also allowable that it is checked on an essential port transition relationship such as one being defined as a priority processing request input port, and as an essential transition.

B) Priority Processing Request Processing

1: Priority processing is requested by an output source port.

2: An input destination identification group and a reference placement group are requested to carry out priority processing.

3. Real placement information and status information on an identification group and reference placement group subjected to transition definition are received.

4: Priority conditions for an output destination are calculated by using the following information.

Transition output information

Relatedness real placement information

Relatedness status information (Real placement information)

5: On the basis of priority condition calculation, identification information on an input destination placer is extracted from identification group real placement information.

6: Transition output information is sent to an input destination identification group port together with transition destination specifying information (list) or to a corresponding placer port.

For the priority processing request input according to FIG. 9, the above relationship is illustrated. Once a priority processing request input is carried out to a transition control object, an identification group and a reference placement group are asked for real placement information and a status, and an input is carried out to an input port for priority processing request input targets.

Status information on a priority processing request includes information on the input port for priority processing request input targets and information on an output source instance.

Output counter: In the case where an output from a placer of an identification group has been received, it is also allowable to send the output as it is, in the same way as ordinary input/output port definition placement groups do. However, it is also possible to make the output to be sent by using identification information to filter or process it in an appropriate form. For this purpose, a transition control object can be used (can be also incorporated as properties). In this case, an output source needs to be an identification group.

A) Placement Step

Same as in the priority processing.

B) Output Counter

1: Priority processing is requested by an output source port.

2: An input destination, an output destination, and a status object are requested to carry out priority processing.

3. Real placement information and status information on an identification group and a reference placement group are received.

4: Priority conditions for an output destination are calculated by using the following information.

Transition output information

Relatedness real placement information

Relatedness status information (Real placement information)

5: Output information is processed on the basis of output condition calculation or is subjected to the condition calculation, and if it satisfies an output condition, processed information is outputted.

6: Transition output information is sent to an input destination.

For the priority processing request output, the above relationship is illustrated.

Once a priority processing request output is carried out to a transition control object, an identification group and a reference placement group are asked for real placement information and a status so that determination is made on output conditions, and once an output is carried out, it has its value or status information changed and is sent.

A model of transitions between placement groups: A typical transition model using a priority processing request and processing sequence transition is presented.

Figure 12:
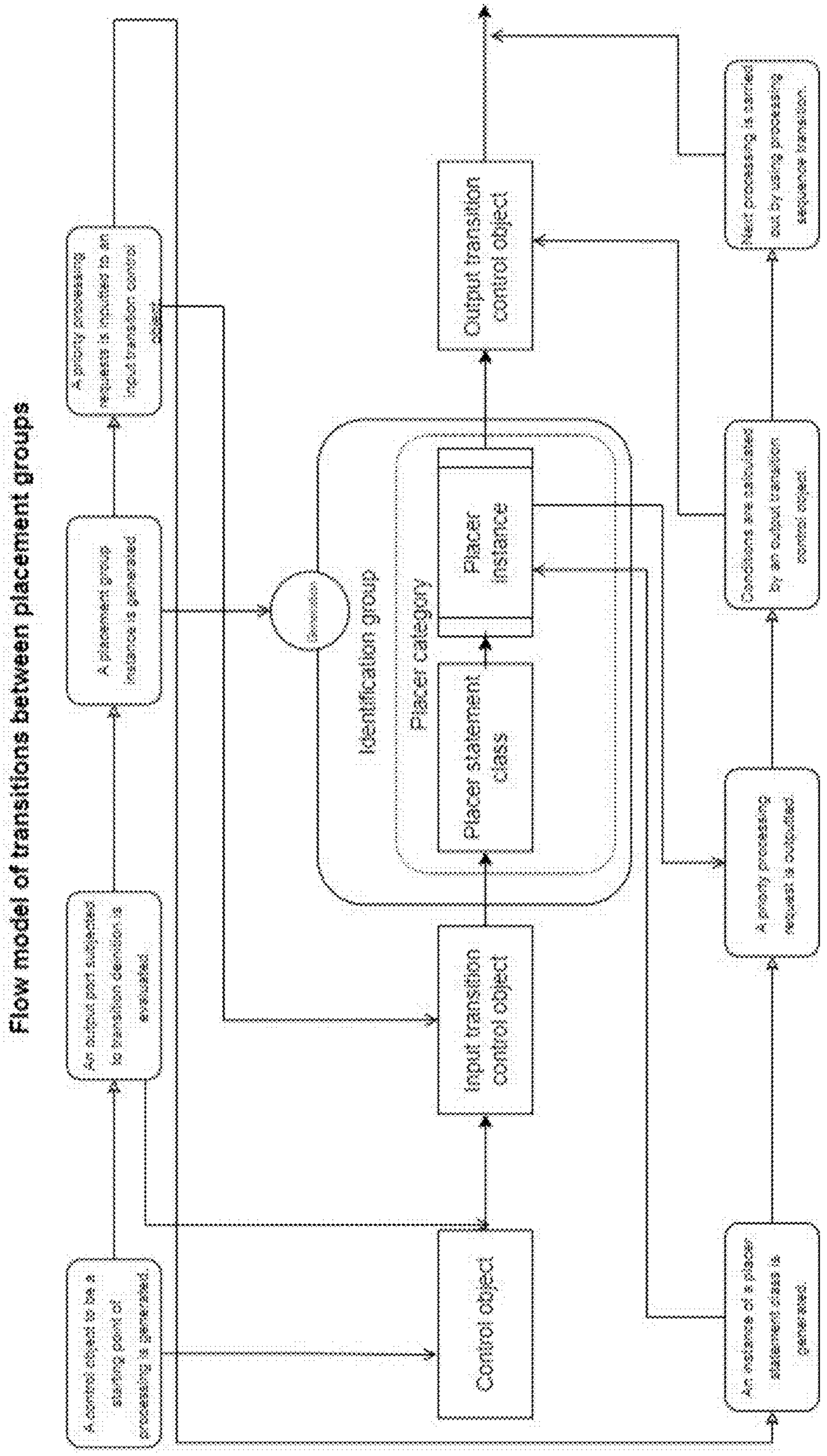

While FIG. 12 being referred to, a flow model of transitions between placement groups is explained. This flow is described as a relationship between a process flow and objects corresponding thereto in a diagram of FIG. 12 to show a flow model of transitions between placement groups.

1: A control object to be a starting point of processing is generated.

2: An output port subjected to transition definition is evaluated.

3: A placement group generating input subjected to transition definition generates a placement group instance.

4: A priority processing request is inputted to an input transition control object with the placement group of the 3 being an identification group.

5: Priority processing is carried out and an instance of a placer statement class whose category is most suitable in an identification group is generated.

6: A priority processing request is outputted by a generated instance.

7: A condition is calculated by an output transition control object and when the condition is met, output is carried out.

8: Similar processing is carried out by using processing sequence transition.

Placer accordance check/Placement group: For setting a placer in a placement group, it is checked on whether a placer to be placed satisfies its category accordance conditions and is determined on whether it should be associated. Additionally, by checking on whether a placer already associated with that placer satisfies category accordance conditions of that placement group, association is allowed to be carried out in a manner satisfying structuration conditions. On this occasion, a structure to be established is determined by setting properties of whether or not to allow that whether category accordance is mutually satisfied, whether unilaterally satisfied, and whether no condition is present, be associated with each other.

As for a certain placer

1: Check on whether a placer accords in category. If not, it cannot be placed.

2: Check on whether numerical range conditions are accorded with (nearing limits of the range).

3: A placer which has been associated cannot be placed if it does not accord with determination conditions in accordance with properties.

4: Incorporate, into association check targets, associated placers out of placers which can be placed. Carry out this for all placers being targets of all the association checks. The checks are carried out sequentially in an order of registration. In the case of making registration by using a list, it is also allowable that verification priority degree is given.

Carry out this placer accordance check, on the occasion of editing, at the time of placing a placer or at the time of requesting priority processing.

Figure 13:
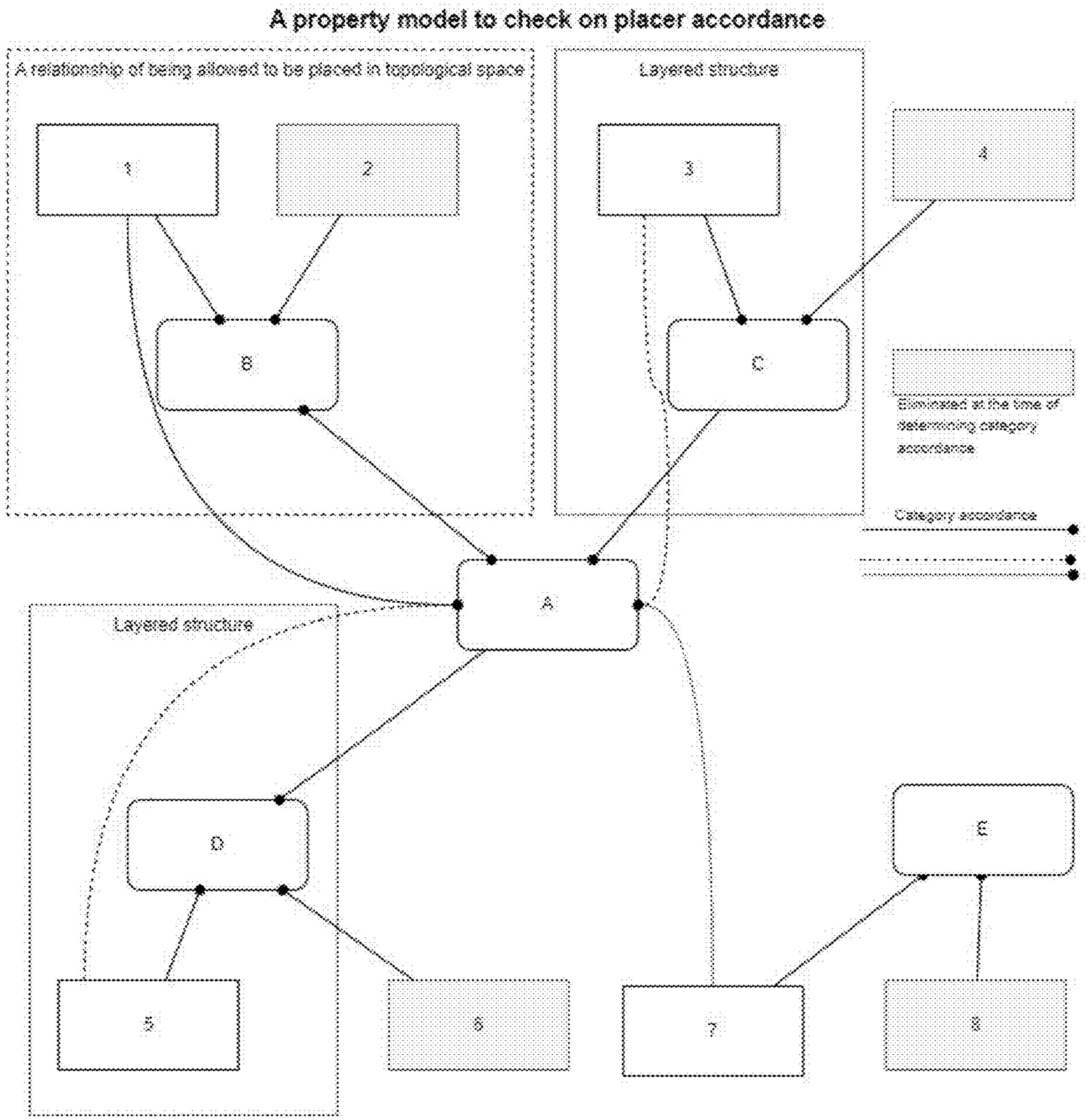

FIG. 13 is a diagram to show a property model to check on placer accordance.

FIG. 13 illustrates such properties in detail.

A rectangle in the diagram is a control object, or a placement group to be subjected to accordance check. Rounded rectangle A is a placement group which determines relatedness while other rounded rectangles are placement groups which receive inquiries about relatedness.

A relationship of being allowed to be placed in topological space is a restriction in the case of being placed in a GUI where slots of a placement group are placed in space (allowed to be so, also in a manner of being partially overlapped by each other) while control objects are placed therewithin and in a specification along therewith. In this case, it leads to properties of allowing only conditions of "satisfying category accordance with each other."

A layered structure is allowed only in the case where placement groups are layered and is allowed only in the case where "satisfying it unilaterally." In order to prevent a lower placer from belonging to its upper group directly, it is necessary to control an order in such a manner as carrying out sorting under a categorized condition and initiating checks thereafter.

A placer structure may be subdivided by adopting other combinations or orders.

Figure 14:
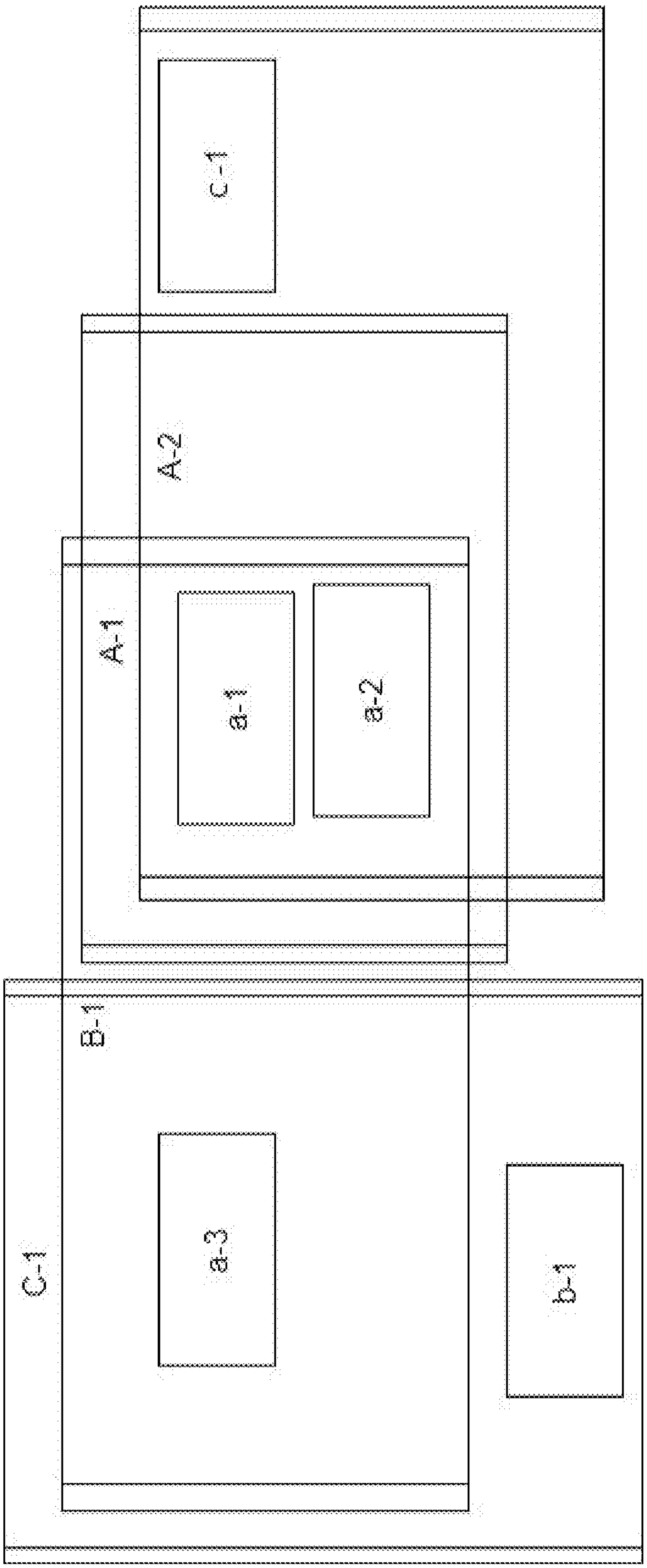

FIG. 14 is a diagram to show an example of placing, in a GUI, control objects in a placement group.

The example of FIG. 14, of placing, in a GUI, control objects in a placement group shows an example of placing, by configuring a relationship of being allowed to be placed in topological space, control objects and a placement group.

An icon given a small-letter alphabet shows a control object, and while objects for which it is the alphabets that are different differ in category, those for which it is numerical symbols that differ are statement classes having their category in common. One that is given a capital letter is a placement group.

Implementation as a descriptive API: It is also possible to register a basic model object in a structural statement using json, xml, html forms, and so on. A static identifier is key information for a dictionary in this case. The following formula shows an example of the statement.

[Formula 1]

Statement example
Arrangement_Group list

```
[
{
     "id": "b9922349-57e6-4ccf-ad68-88906a530145",
     "title": "Osaka_attractions",
     "category": "tourist_attractions_C"
     "type":"I/O_port_type"
     "status": " ",
     "control_object": {"A": "e7b43ba3-6a30-45f7-882f-a716a7480d92",
"B": "491c9da8-bc31-40a6-9dc9-b3e1f49f1a2b"},
     "arrangement_group": { }
  },
{
```

<<Prototype Widening Model>>

The inventor of the present invention has proposed an event management system in advance of the present invention. The event management system is a system that a business user of the system uses on the occasion of holding an event through gathering end users. It has been made by fully using a GUI to support programing so that even if the business user is not very familiar with programing, he/she can alter a system as well as make it newly.

Placement group functionality is introduced into an event management GUI prototype. The functionality is taken in by widening module functionality. For that purpose, the following functionalities are incorporated into a prototype.

1: Introducing a category into a module

2: Introducing a box-type module (group box, category box)

A placement group is placed as a flow-type transition icon as one of the box-type modules, and connected with an external portion through a transition arrow as an ordinary module is. Boxes and modules standardized on the basis of category information are placed in an internal portion, and transitions are managed by a placement group functionality. A placement group box has functionalities as an input/output port definition placement group for a basic model. Modules other than boxes are handled as a control object for the basic model.

Category: functionality to categorize a module and a placement group in accordance with input/output ports, placer category, and functionality. Category accordance check is carried out at the time of setting a category and at the time of placing an icon. Inheritance relationship between the categories keeps to a basic model. The placement group can have processing group functionality as its property. Additionally, a category box object has functionalities of accommodating this category of objects and carrying out accordance check for them.

Input/output ports and Transition: In this introduction model, an input/output port has information type, category information, and return value port functionality as in a basic model. A return value port consists of a combination of two input ports and output ports, but is recognized as a single port on a GUI. The input/output port has its category defined incidentally at the time of a module category being defined, but it has its own category database information and is managed thereby.

A transition can be defined between an output port and an input port. It can be set freely (by a transition arrow, etc.) between input ports and output ports of an accommodated module and group box, and its processing takes precedence over processing groups.

Module: One obtained by adding a category property as a functionality to a prototype module. It can be accommodated in a category box that accords in category, and a transition relationship in that case is either defined directly or defined by a processing group functionality of a group box belonged to. Blank icons exist for dynamic module placement and category definition simplification. It is also allowable to limit modules to regular modules.

Box: A box object has a (placement) group object and a category box object. The box object has identification information as a global module and can be placed in a plurality of functionality sheets. Each of the boxes has a functionality of accommodating other object icons and storing them as structured data such as a list. It also has a functionality of displaying, on each of the icons accommodated, relatedness information on accommodated objects such as list order information and of rearranging it. In this implementation, an order is determined in accordance with the relative position on a sheet, and two-dimensional numbering is carried out. Or a priority order is specified with a transition arrow indicating an order.

Group box: A box object to take charge of placement group functionality. Within the box, a category box can be accommodated and a plurality of category boxes can be placed in correspondence to each placer category. At the time of checking on placer accordance, modules or group boxes inside all the category boxes of corresponding placer categories are aggregated and are checked on accordance. On this occasion, a situation of an accommodated placement group box of a category box placed in another group box is checked for each category box. Additionally, an input/output port of the group box has a functionality of connecting an input given instance identification information with a corresponding port of a corresponding instance.

A group generates its own set of input/output ports from extraction ports in accordance with properties. Additionally, a property category is set and from a real placement information (return value) port, real placement information can be returned.

Further, it is also possible to add processing sequence transition definition information between categories to form a processing group.

Category box: A box to accommodate modules or group boxes of a corresponding category. It is intended to manage a set of objects and has no input/output port. It can also be defined as global, in which case it can also be placed in a plurality of group boxes. It has a functionality of checking on whether an object to be accommodated accords in category. No limit is imposed on a placement count, but when a category box is placed in a group box, and when a new object is placed in an already placed category box, an accordance check is carried out on the group box.

Blank object and Wild card object: On the occasion of defining a category or defining a statement class, it is also possible to define it not from an existing module but by adding definition information to a blank module or box object. Additionally, it is also possible to define a wild card object that leaves the statement content blank for the purpose of using an external definition API. It is also possible to use a statement class dynamically by specifying a URL or the like as a wild card. This corresponds to associating placers dynamically as in a basic model.

Figure 15:
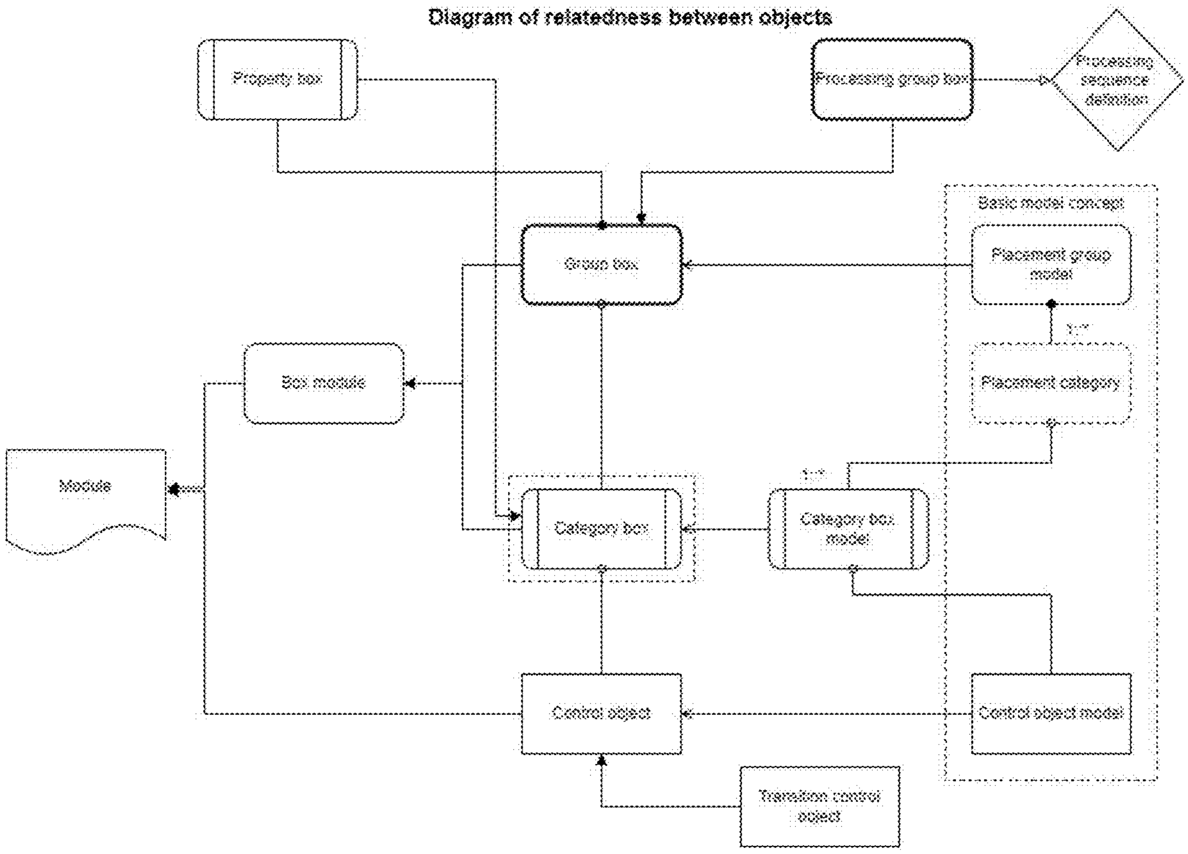
Figure 15:
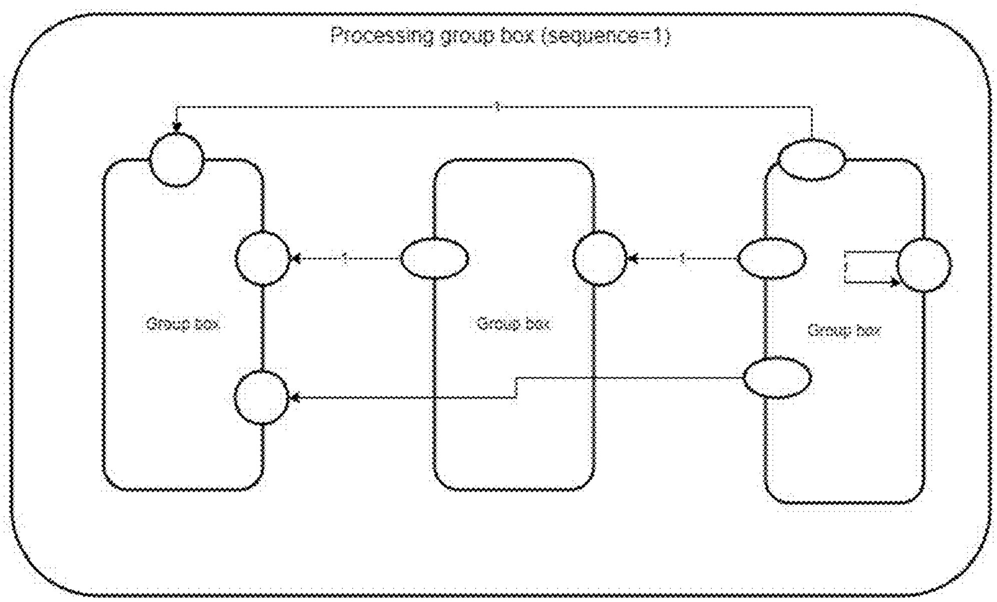

FIG. 15 is a diagram to show relatedness between objects in a prototype widening model.

FIG. 15 illustrates the above-mentioned relationship

An object specific to a widening model is defined as a prototype module. Modules are divided into two, control object-type ones and box module-type ones, whereas boxes are divided into group boxes and category boxes.

These are in correspondence relationship with objects of a basic model. Control objects (and transition control objects) have functionalities of a control model of the basic model, and the group boxes correspond to placement groups having identification functionality. Although not directly corresponding to a placer category of the basic model, the category boxes serve as an object for accommodating placers associated with categories. Additionally, they have a property category by default and are accommodated in a property box.

The group boxes work as processing groups through being given processing sequence definition.

Priority processing request: In this introduction model, a functionality of realizing a priority processing request is a function of adding instance identification information to a real placement information port of a group box, and return value ports and input/output ports of each module. Definition of transitions from and to transition control objects are usually managed by processing groups (categories) and have no special priority processing request categories.

Processing sequence transition: The processing sequence transition according to a basic model is realized by processing group functionality. It is executed by defining transition definition information between category ports of modules or group boxes of a placer category, as properties of a group category, and placing (a category box for accommodating) a placer object in the group box.

Category definition: Category definition processes in this model are grossly divided into module category definition processes and box definition processes. Additionally, for each of them, two types, category generation setting for statement-completed modules and generation setting using blank objects, are present.

A first step of category definition is to specify a category definition target. If the statement-completed modules (not groups) are to be used, one module statement is specified and if the blank objects are to be used, blank objects of classes to be defined are placed.

Next, category identification information is defined. If inheritance categories are intended to be generated, one or more parent categories suitable for a target object are specified from a category list and category information is specified to be generated. Otherwise, category information is simply specified to be generated.

In the following step, input/output ports are defined in the case of modules and placer categories are defined in the case of group boxes.

If inheritance source categories are present, input/output port definition inherits input/output port categories from the source categories. In the case of blanks, input/output port sets of the inheritance source categories are defined as they are. A category accordance operation is carried out for a statement module. Ports of modules identical in type and information type all need to be specified by being matched with category ports. A specified input/output port is provided with category information and is thereafter handled as a category port. In the case where an unspecified inheritance source category port remains, the definition cannot be carried out.

An additional port category is specified for a module having no inheritance source or having completed port inheritance. Category identification information and information type information is specified and is specified to be an additional port or an existing type-only port.

A step of generating a module category is as described above. In the case where a statement module is used for definition, a statement class thereof is updated into a statement class having the category.

A placer category is defined by specifying a placer category out of a category list of modules or group boxes and placing it (generating corresponding category objects of a blank and placing one of them). Additionally, numerical range information thereon is specified simultaneously. Further, at the time of extracting a port, it is specified how to handle a port of a category thereof. It is specified in accordance with a basic model. This is carried out for a category requiring it.

Once a category is specified, it is specified to accord in type. This is also carried out in accordance with the basic model. In addition, an aggregation property of an extraction port is specified in accordance with the basic model and a set of the extraction ports is generated.

Figure 16:
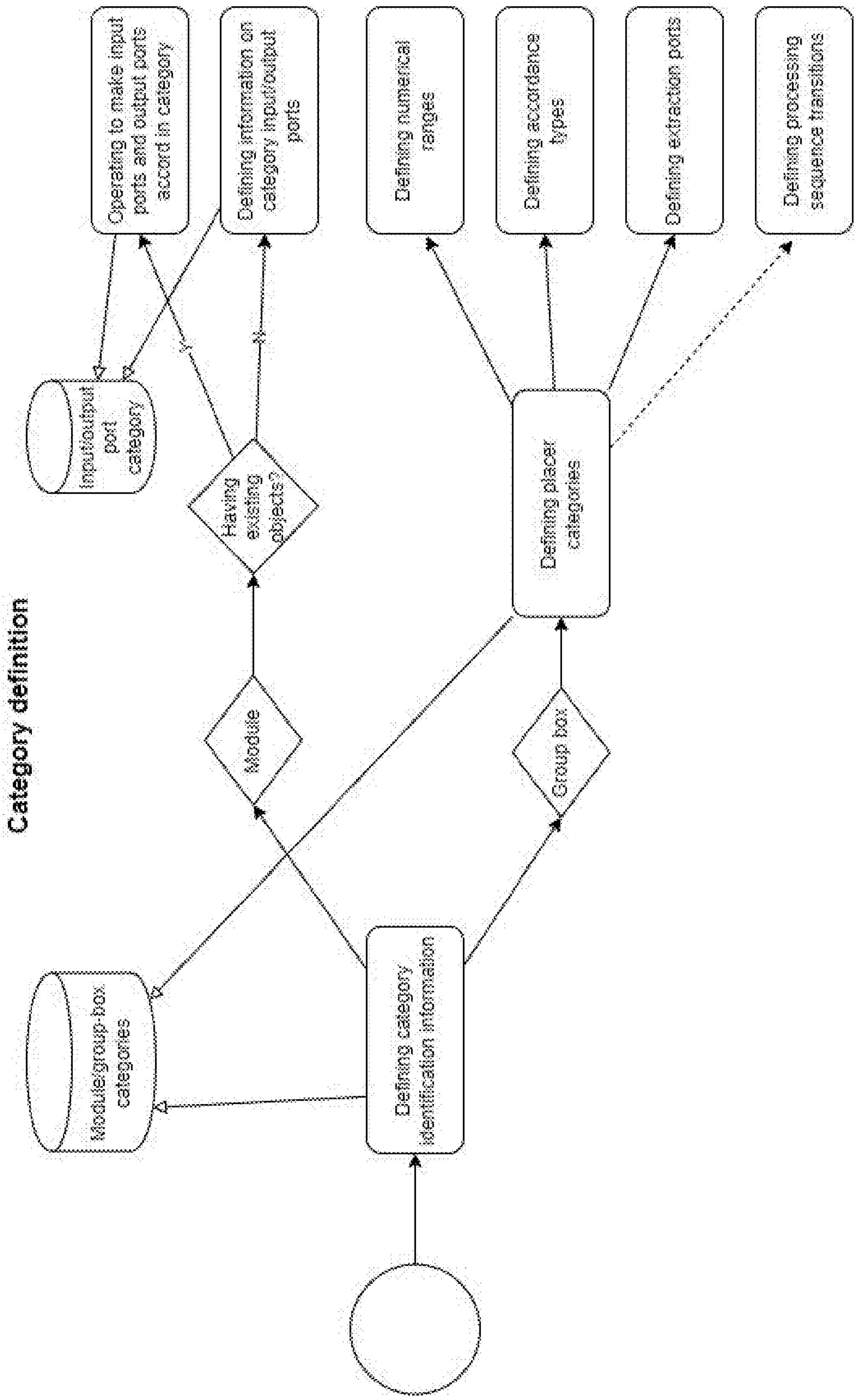

FIG. 16 is a diagram to show category definition.

FIG. 16 illustrates the above-mentioned matter.

If the group box category is intended to be a processing group, a processing sequence transition is defined by defining a transition between category ports through using a transition arrow or the like between ports of a placement category object.

The above examples of definitions are illustrated in a processing group (box) definition diagram. According to the diagram, sequence transitions are defined by attaching numerical symbols to an ordinary class statement, and definition is made by putting a sequence name, 1 on transition arrows and a box.

A step of generating a group box category is as described above.

Class statement: A statement in which to place, on a sheet, modules and box objects that are categorized, and make them work as a prototype module is made. A statement class for modules and box objects is generated, objects are placed in a box, and transitions between outer boxes and ordinary blocks are defined. Category definition is made, in a definition module placed on a route sheet, on a functionality sheet in a box, or on a dashboard.

Statement class generation: Generation of statement classes of modules, group boxes, and category boxes and category setting for existing modules are carried out as follows.

Not as for an existing module, a blank object is specified to generate unique identification information on a statement class.

Next, as for a category box, one is selected from a category list and accommodation category information is specified. As for other objects, one is selected from the category list and category setting for a statement class is carried out.

Next, as for an existing module, a category accordance operation is carried out. This is carried out just as a counterpart operation for category definition is done.

As for a blank, it is selected whether to carry out internal statement or specify the blank to be a wild card. As for a wild card, identification information is made to accord with reference destination information. In the case of carrying out internal statement, the modules are stated in accordance with notation of a prototype, and in the case of a box object, an internal portion is defined by intra-box placement.

Figure 17:
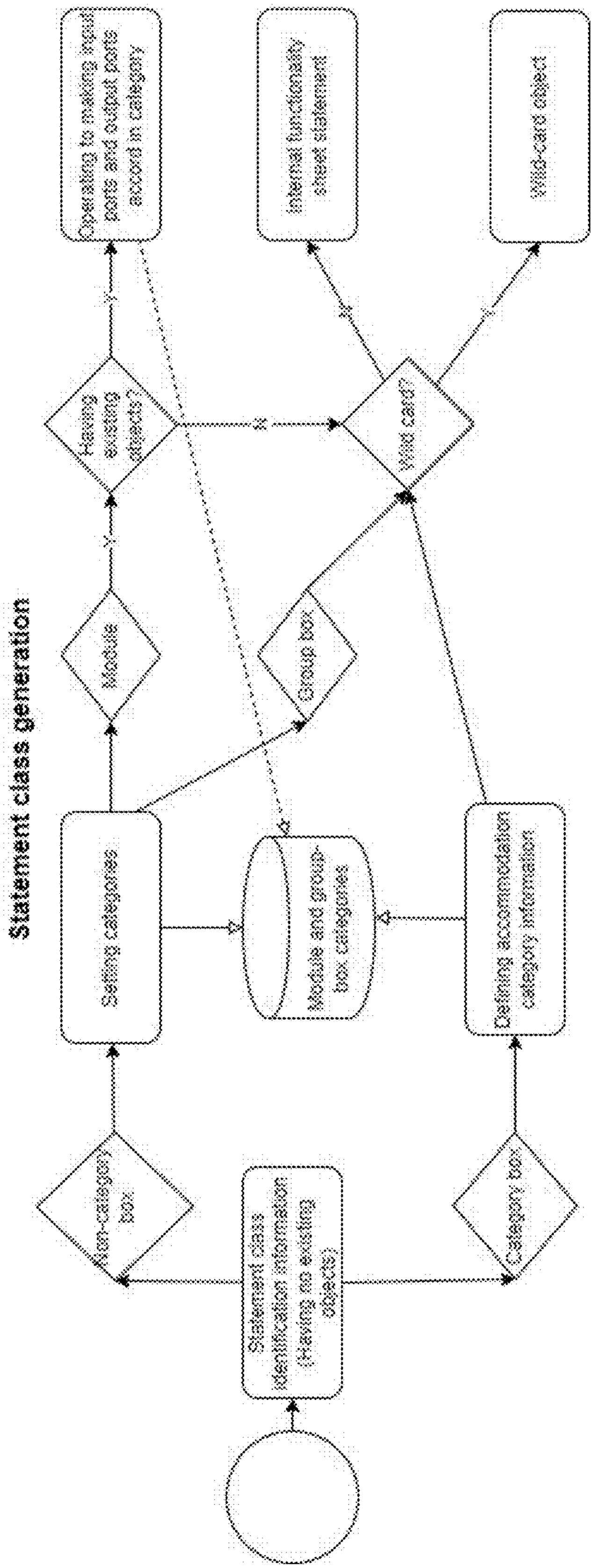

FIG. 17 is a diagram to show statement class generation. FIG. 17 illustrates the above-mentioned matter.

Intra-box placement: Modules and box objects defined as statement classes are placed on an intra-box functionality sheet.

It is only a category box that can be accommodated within a group box. Definition is made on the spot, or a category box corresponding to a placement category is specified from a module list and placed. Accordance check is carried out every time placement and internal configuration are changed, but the category box itself is not a check condition and is used only as a container for placers of internal placement.

It is only statement classes of categorized modules or group boxes that can be placed in a category box. At the time when they are placed, it is checked on whether they accord, in accommodation category of a box, with placer categories.

Additionally, static identification information is given to each of the placers in accordance with relative positional relationship on the sheet. It is also allowable to make definition by carrying out labeling discretely.

Figure 18:
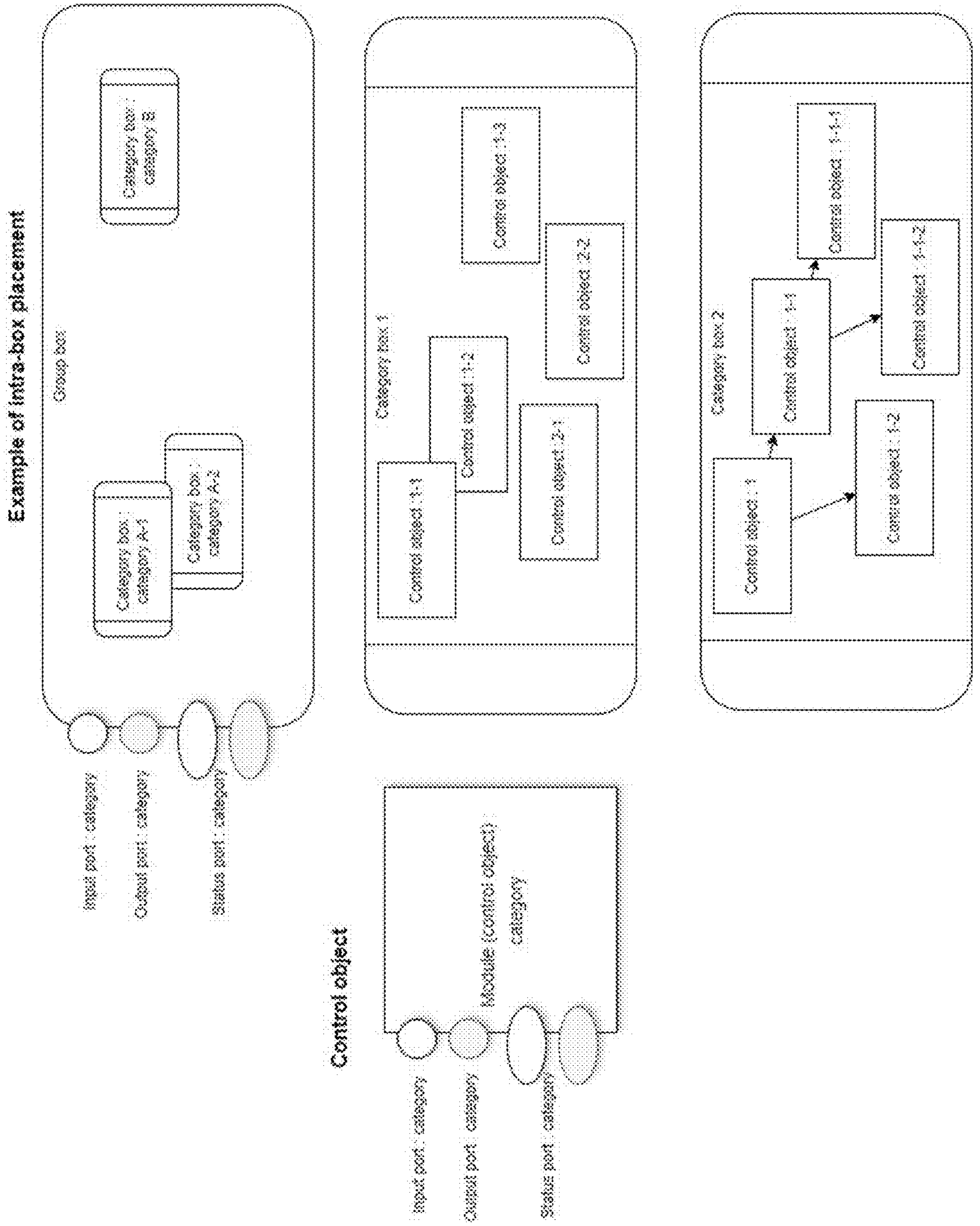

FIG. 18 is a diagram to show an example of intra-box placement. FIG. 18 illustrates the above-mentioned relationship.

In a group box, a category box is defined and a plurality thereof is placed, for each category. In Category box 1, control objects are placed, and relatedness identification information is given numerical symbols in a matrix with two sets of numerical values in accordance with positional relationship of icons. In Category box 2, relatedness identification information is similarly defined by transition arrows and is given numerical symbols in a directory-type manner.

Extra-box transition definition: Input/output ports of outer group boxes that are not included in box objects have functionalities similar to those of input/output ports of ordinary modules, and can be given transition definition in accordance with notation of objects and prototypes having other ports on a sheet. Additionally, transitions from and to statement classes that has been directly given transition definition are also effective. Instance identification information is given participant identification information that can be used in a prototype, group attribute information by a member scope, and so on, and can be used internally.

Figure 19:
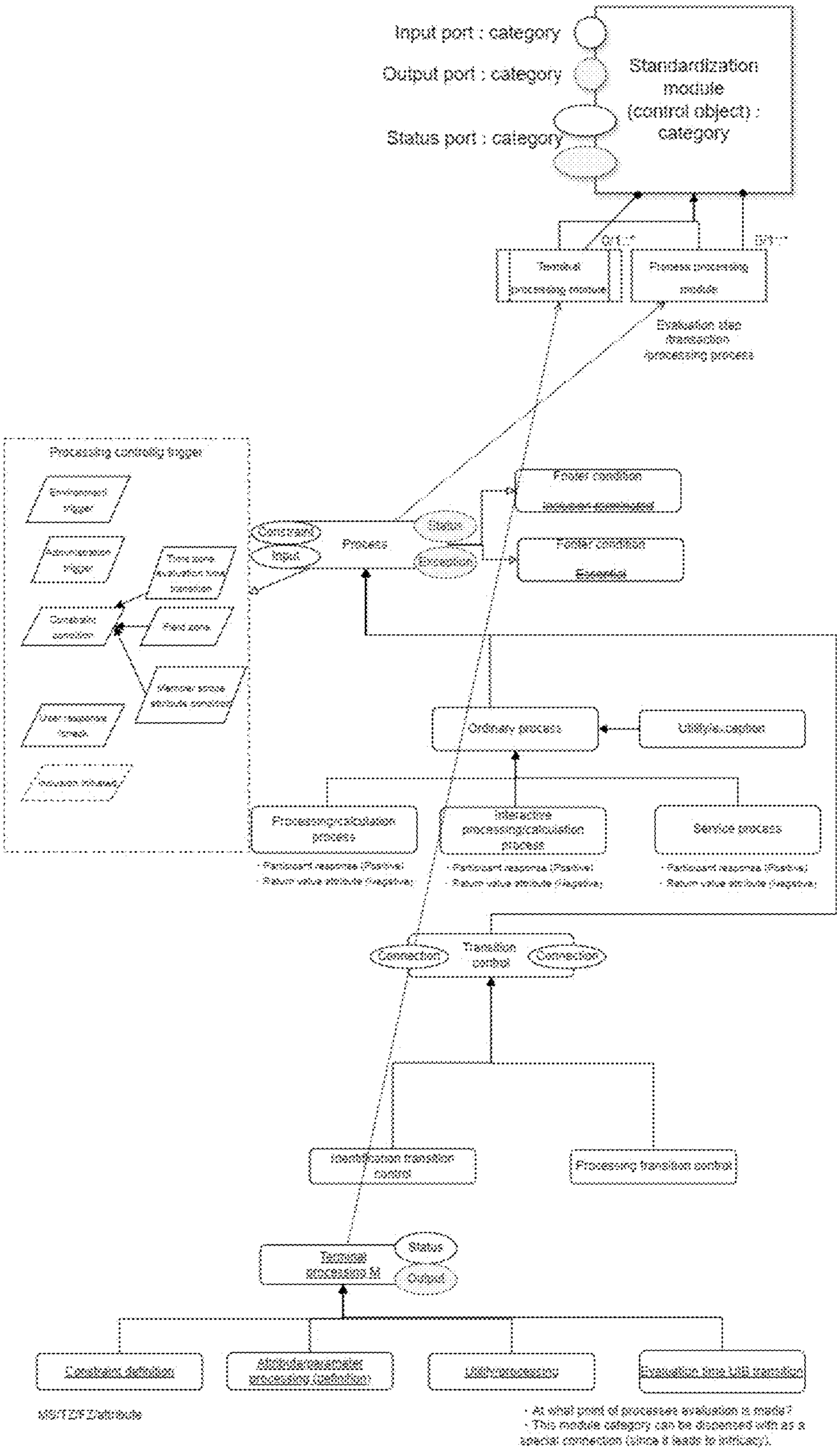

FIG. 19 is a diagram to show how categories of placers are modeled in a prototype element. Standardized modules are grossly categorized into process processing modules and terminal processing modules and categorized in accordance with functionality and port type as shown in FIG. 19. Each of the categories is divided into categories having concretely detailed functionality by being inherited.

Standardization modules can have a plurality of process processing modules and terminal processing modules corresponding to different inputs. They can also have both process processing modules and terminal processing modules.

Figure 20:
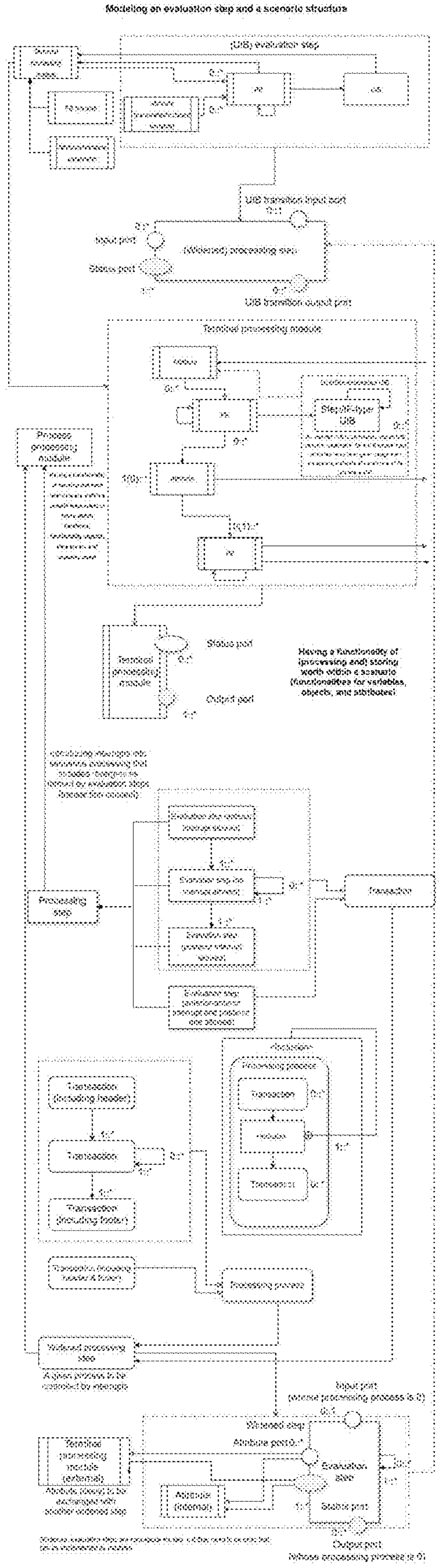

FIG. 20 is a diagram to show how an evaluation step and a scenario structure are modeled. Since the present invention has, as described above, functionalities of checking on category accordance and checking on placer property accordance, it allows an evaluation on whether or not an application program works appropriately, to be carried out. That is called an evaluation step in FIG. 20.

Figure 21:
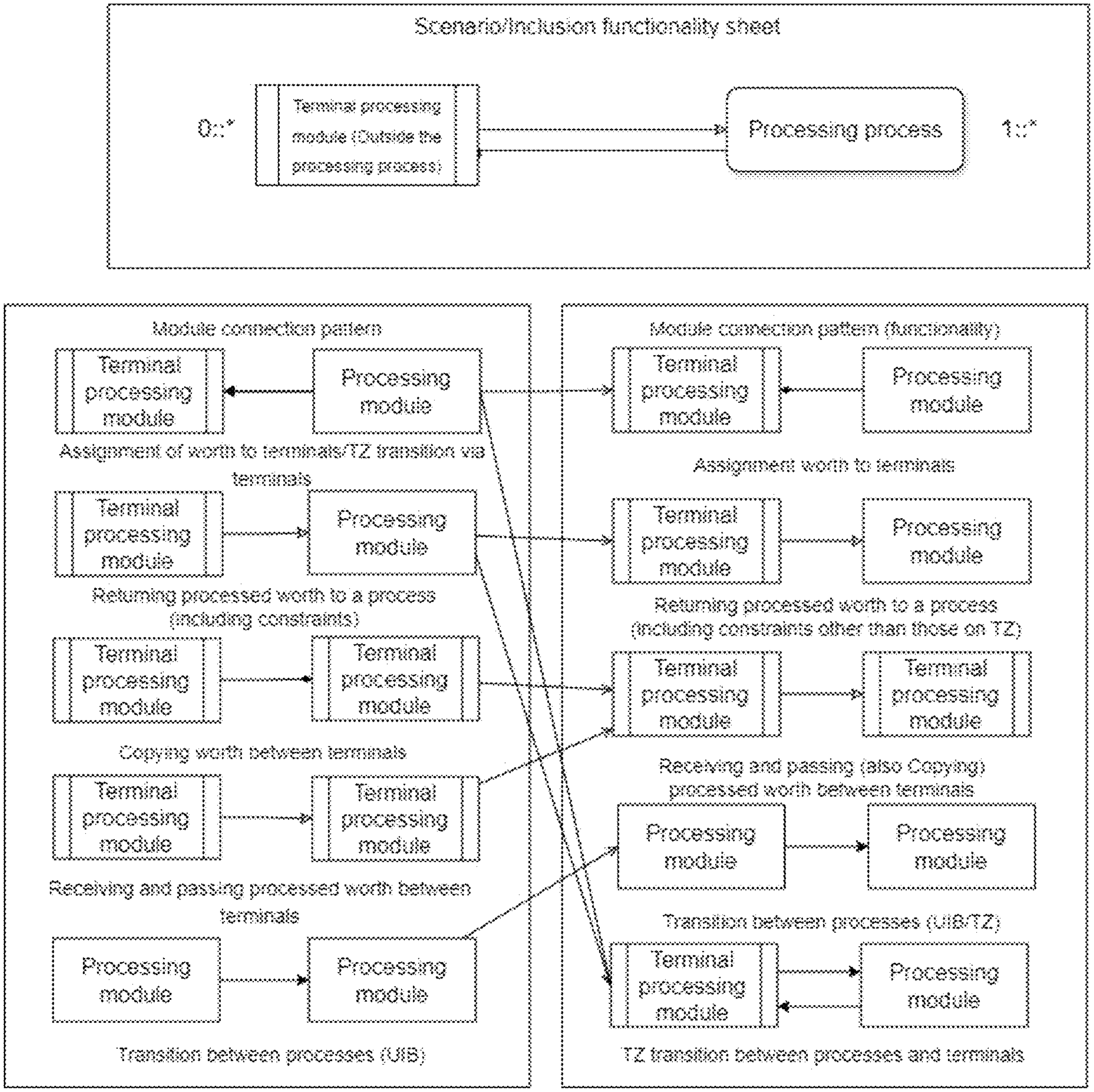

FIG. 21 is a diagram to show a module connection pattern. To consider that to place the above-described placer is module connection is also allowable. In FIG. 21, a flow of a series of processing is referred to as a scenario and is regarded as realizing a serial flow of an application program by connecting modules.

<<Grid Model>>

A specification in which to realize placement group functionality in a spreadsheet-type GUI that can accommodate object icons in its grid. A UI is configured from a spreadsheet, an element called a matrix obtained by demarcating part thereof in a matrix form, modules placed in a grid, and an accessory graphic. By allocating identification groups and processing groups to coordination axes of the matrix, behavior of accommodated module objects is controlled on the basis of information on relative position of the grids and information on processing sequence transition definition thereof.

In a statement, a matrix is described also for a three-dimensional matrix, but in a diagram, it is for a matrix of up to two dimensions in order to be easy to understand.

Additionally, a grid model can be understood as an enhancement of spreadsheet functionality.

1: In spreadsheet software, a function embedded in a cell is thought of as having one request return value port, whereas in a grid model, an object that handles input/output for control is targeted. Therefore, it is not a cell but input/output ports of a placement object that is to be controlled.

2: Identification group functionality and processing group functionality are defined for a grid domain, to make a sheet itself have processing functionality. They differ in this respect from a spreadsheet functionality whose functionality definition results in a function to be placed in a cell, and a macro functionality of defining such operation procedurally.

Module: One that manages, just as a prototype-widening model does, function functionalities including a functionality of receiving categorized arguments and that of receiving and passing return values, and control objects and placement groups, by using icons. Placement groups can be of this grid specification or of any other type. However, it is treated as a control object in a placer accordance check. It is subjected to the conformance check when placed at a location in a matrix.

Input/output ports: In this model, it is each of domains constituting a module, a table, and an identification axis, that has input/output ports. The above matrix has input/output ports that behave as input/output port definition placement groups for internal modules and reflect placement module categories.

Port icons appear around object icons as needed, and are used as definition starting points at the time of defining transitions directly.

Transition definition: In this model as well, it is possible to define transitions between output ports and input ports of a matrix in which modules or input/output ports are defined. One is a direct definition that directly connects certain category ports with each other, wherein a display indicating transition status appears as needed. The other is to use processing axis lanes of a table to define processing sequence transitions between identification axes. In this case, no input/output port icon is expressed. Limitations on direct definition depend on a basic model.

Matrix: An object in which a grid for placing modules is arranged longitudinally and transversely in a rectangular shape. It can also be developed into a three-dimensional matrix by being made to have relatedness between a plurality of sheets. A graphic processing in which to demarcate perimeter is carried out as needed. Three types of objects that have functionalities are present, which are a grid sheet being a whole sheet of a grid UI, a table to realize a placement group functionality, and a domain partly modularized. The matrix can have identification information, category information, and input/output ports, as placement groups.

Matrix has a base point, which usually lies on top left (It is also possible to place a base point in the matrix by setting a 0-number column, and row). A sequence numbers are set in the direction of a row and a column from the base point, and the grid is managed by this integer vector for its position information. If one grid belongs to a plurality of matrices, it has position information for a context of each of the matrices.

Within the range of the matrix, grid sequences arranged longitudinally on a transverse axis of a screen are made to be columns, and grid sequences arranged transversely on a longitudinal axis of the screen are made to be rows, each of them has a column number and a row number. Additionally, it can have a name and identification information besides a number, in order to be more identifiable.

The matrix can also be made to be inoperable in accordance with a user level. This is because by designing a matrix, system algorithm is realized so that by having ordinary users low in skills carry out only module placement, the system is allowed to be easily updated.

Grid: The grid corresponds to a cell in a spreadsheet, accommodates module icons, and exchanges values and timing information in accordance with definition information on a belonging matrix. It has relative position information with respect to the belonging matrix and can make it be used as static identification information on accommodated objects. One grid can also be defined as a domain, which will be described later, and in that case, it can have a functionality of the domain.

Grid sheet: A matrix to constitute a field upon which tables and domains are placed so that control by placement group processing is realized. One sheet constitutes one screen (window) of an UI. It is also possible to process not only one sheet but also a plurality of grid sheets as a three-dimensional matrix, in which case relative positions of the grids are managed by the overall position information of the matrix and the grid sheet identification information. The relative position information of all matrix grids on the grid sheet is associated with the relative position information of the grid sheet. A grid sheet forming a UI screen in order to distinguish between a UI grid sheet and a processing grid sheet is called a UI grid sheet.

A simple grid sheet refers to a grid sheet that encompasses a whole process. The (processing) grid sheet can also be connected to increase its processing range. The grid sheet itself have no input/output port. Importing and exporting values from and to the outside is carried out by specifying an internal table (and input/output port) (It is possible to define the whole grid sheet as a table). A UI grid sheet can extend the matrix infinitely on a model from a base point.

Table: It is one made by giving priority processing request functionality and processing sequence transition functionality, as a placement group, to an object obtained by cutting off part of a grid sheet as a matrix. Processing axes and identification axes need to be allotted to two axes or three axes of a table matrix (one axis needs to have one of a processing axis and an identification axis). The axes allotted have a grid sequence for one column (row) thereof (ones for a plurality of the columns (the rows) in the case where the plurality is made), which are called an identification axis sequence and a processing axis sequence, respectively.

In the case of three-dimensional ones, either of them is a matrix.

It is also allowable that for the identification axis sequence, no limitation is put on a range of sequence numbers.

A table-type placement group has, for its placers, a module placed and an identification axis sequence. It is also allowable to define a plurality of tables in one identical domain. On that occasion, each of the tables is handled as an association placer (topological space condition).

Additionally, the tables have input/output ports for an input/output port definition placement group.

Figure 22:
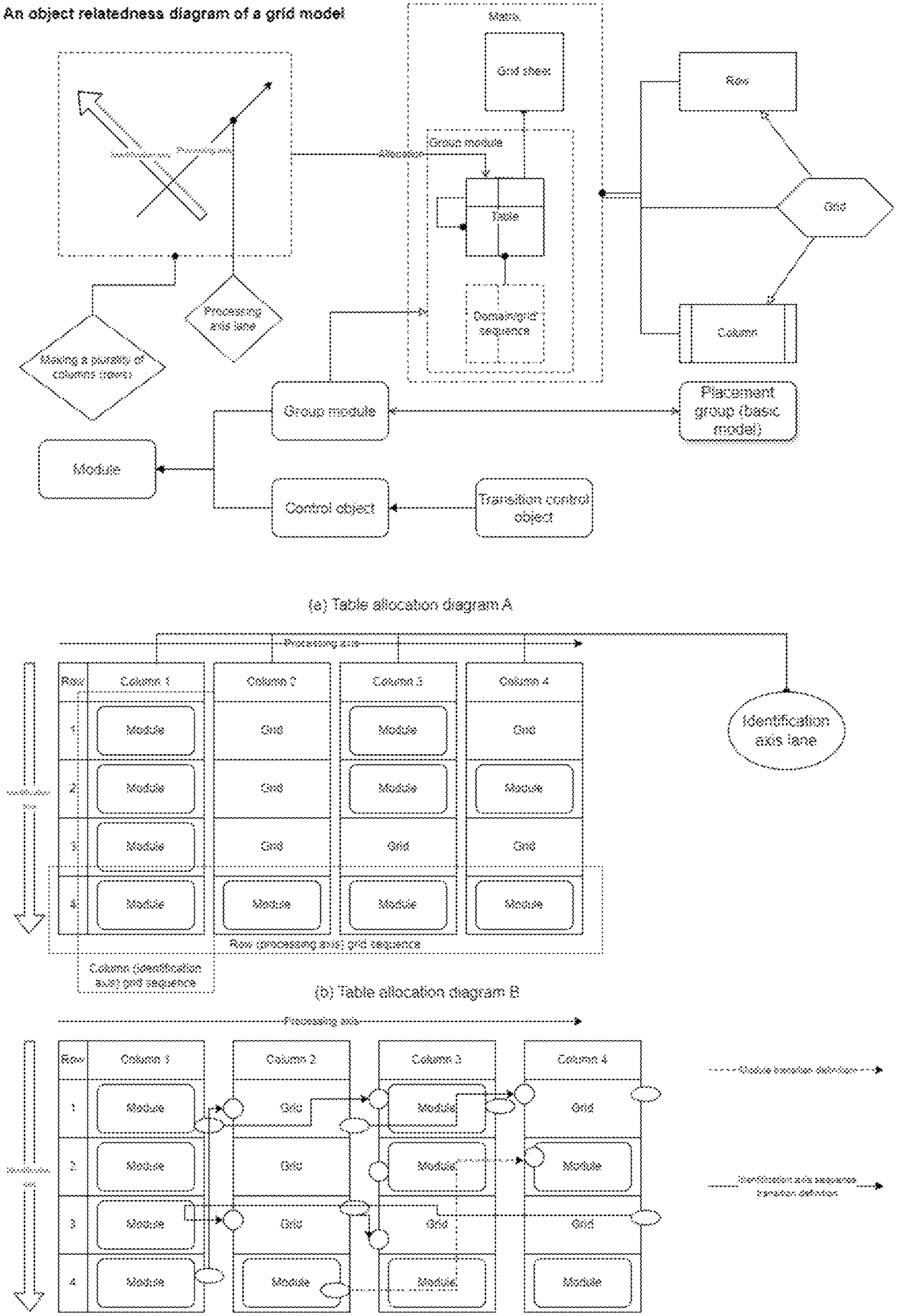

FIG. 22 shows an object relatedness diagram of a grid model.

FIG. 22 illustrates relationship between objects related to a grid model.

In this model, objects are placed in a GUI adaptor's grid formed in a grid structure having a combination of row and column, called a matrix. Objects to be placed in the grid are defined as modules. They are grossly divided into control objects and group modules, which correspond, in a basic model, to control objects and placement groups, respectively. The group modules are, in the matrix, separated between a table and a domain, and are placed in a grid sheet being a largest adaptor. Additionally, the domain is one obtained by cutting off part of the table. The group modules have processing axes and identification axes through allocation. They have functionalities of putting together identification axes to make processing axis lanes and make a plurality of columns.

Identification axis: Once it is allotted as an identification axis, a grid sequence (matrix) thereof comes to act as an identification group that accommodates modules with respect to a processing axis. An identification axis sequence has a functionality as an identification group and has a basic transition control functionality. By inserting a transition control type category into a processing axis lane, intricate control is also allowed to be carried out.

The identification axis sequence needs to be given a placer category definition. Except for input/output ports which have been set in terms of a system, extraction is made as a union set type or a product set one from placer category information.

Basic control type A: Processing of a grid sharing a processing axis sequence with an output source is prioritized (That which makes transition to a statement model identical in sequence number to a processing initiation statement model is prioritized as a processing sequence context). In the case where the grid is blank, transition is made to a module younger (larger) in sequence number (An initiation sequence number is retained in a context).

Basic control type B: Retaining information on processed modules. In accordance with order information generated from specified static identification information or identification status information, processing is carried out from a module statement class high in priority degree, and next, in the case where a transition is carried out to an identification axis sequence, priority calculation is carried out for modules other than the processed modules, and a next processing module statement class is specified.

Processing axis: When a processing axis is allocated, its grid sequence (matrix) is used as transition control information (processing axis sequence). However, what is important as a functionality of a processing axis is a set of identification axis sequences placed side by side along that axis. This is called a processing axis lane. In order for the table to work as a processing group, it is necessary to define transitions between ports of an identification axis sequence that constitutes the processing axis lane.

Usually, at the time of assigning axes to a table, definition is carried out by defining (category) transitions between ports of the identification axis sequence at the end of defining a placer category of the identification axis sequence. Additionally, it is also possible to adopt a control type in which processing goes on in accordance with a sequence number of the processing axis sequence (sequence processing).

FIG. 22(*a*) shows a table allocation diagram A. FIG. 22(*a*) exemplifies a situation when an identification axis and a processing axis are allocated to a table. In the figure, the identification axis is allocated to a row and the processing axis is assigned to a column, but this may be reversed. A sequence of grids arranged in the identification axis direction (columns) is called an identification axis grid sequence, and a sequence of grids arranged in the processing axis direction (rows) is called a processing axis grid sequence. Additionally, an alignment of identification axis grid sequences is called a processing axis lane. Important elements for carrying out processing are the identification axis grid sequence and the processing axis lane, which work as identification groups and processing groups.

FIG. 22(*b*) shows a table allocation diagram B. FIG. 22(*b*) exemplifies a situation when transition definition is carried out for a table. Modules and identification axis grid sequences can display input/output port icons, and can be used for direct definition and processing sequence transition definition by a processing axis lane. As a result, it is possible to define transitions between grid sequences and module input/output ports by specifying transition arrows and identification information. All transitions are used for direct definitions, and transitions between grid sequences are used for processing sequence transition definitions.

Making a plurality of columns (rows): An identification axis sequence (of a certain placer category) can be set so as to straddle a plurality of columns (rows) (as a matrix). It is handled as one identification group. It is used for such a case as limiting size of the matrix or setting a priority order based on static identification information.

Discretization table: It can be, in order to carry out processing that straddles a plurality of tables, domains, and UI grid sheets, handled as a single table by connecting a plurality of matrices through a shortcut icon. The shortcut icon is a transition arrow icon that represents a connection between matrices. For connecting domains, processing is carried out with all identification axis sequences included in the domains be made to be elements of identification axis lanes. For connecting tables, the discretization table is handles as an inclusion table. Processing axes can be defined together for matrices connected through a short cut icon.

Domain: Part of a table can be also cut off as a matrix, and it be called a domain. It can be handled as a set of (a partial matrix made of) identification axis sequences included therewithin and be defined as part of processing axis lanes of a (discretization) table different from a source table. In the case where ports intended for transition definition overlaps, a transition priority degree is resolved in accordance with processing of processing sequence transition. A grid sequence is handled as a form of the domain.

Inclusion table: A concept of a table can be widened to a non-matrix one. An inclusion table can be configured by including consecutive tables within a table or connecting them through a shortcut icon. A table that has turned out to be an element of the inclusion table is handled as an identification axis sequence, and as an element of a processing axis lane of the inclusion table, transition definition is made between ports.

Processing layer formation (Group module): In a grid, a table can be embedded as a category module. In this case, a UI grid sheet in which to place the table is required, but setting needs to be made on whether this can be shared with an upper sheet. Additionally, an input/output port definition placement group of another form can be also placed if it is in a module form.

Connection icon: A connection icon is used in order to directly define a transition and define a processing axis lane of a discretization table. It turns out to be an icon that shows a correspondence relationship between ports or outer edges of matrices. In a sheet, a linear icon and/or an icon representing mutual correspondence destination is connected with and made to correspond to a port or a matrix. Between sheets, the icon representing mutual correspondence destination is used. Additionally, it is also allowable that to frame information that simply shows a matrix range, unique graphics or identification information is allocated for each table.

Placement: For placing elements of a grid model, firstly, a matrix structure is designed, matrices are designed in a way of including category definition, and then, placing modules in a grid.

1: Grid sheet designing>It is determined whether to put together UI grid sheets into one or prepare a plurality thereof to make them have a three-dimensional or layered structure.

Each of the grid sheets, which are to be made, is to be given identification information.

2: Table placement>When a table corresponding to a processing flow is determined by carrying out algorithm designing, a necessary matrix range is determined and the table is allocated on a grid sheet. On this occasion, relationships between tables and domains between discretization tables are also defined in connection icons.

Placing a matrix

Placing a connection icon

Giving table identification information

3: Table definition>Ordinarily, a functionality of a table is defined regardless of discretization.

3-1: Axis definition>>An identification axis and a processing axis are defined. Additionally, if an identification axis sequence to make a plurality of columns (rows) is present, it is also defined. If an axis sequence is to be provided with identification information, it is to be on this occasion.

Defining axes

Making a plurality of columns (rows)

Giving identification information to axis sequences 3-2: Placer category definition>>A placer category is defined for an identification axis sequence. Category input/output ports are extracted simultaneously. Those accord with a basic model.

3-3: Processing axis lane definition>>A processing sequence transition is defined for an identification axis sequence that a table has. Not all input/output ports need to be defined.

Processing sequence transition definition

4: Module placement>A module is placed on a grid. On this occasion, a placer accordance check is carried out.

X: Category definition>By applying a placement group category at the time of defining a table, a placer category and a processing sequence transition are allowed to be defined. On this occasion, a category accordance check is carried out.

Figure 23:
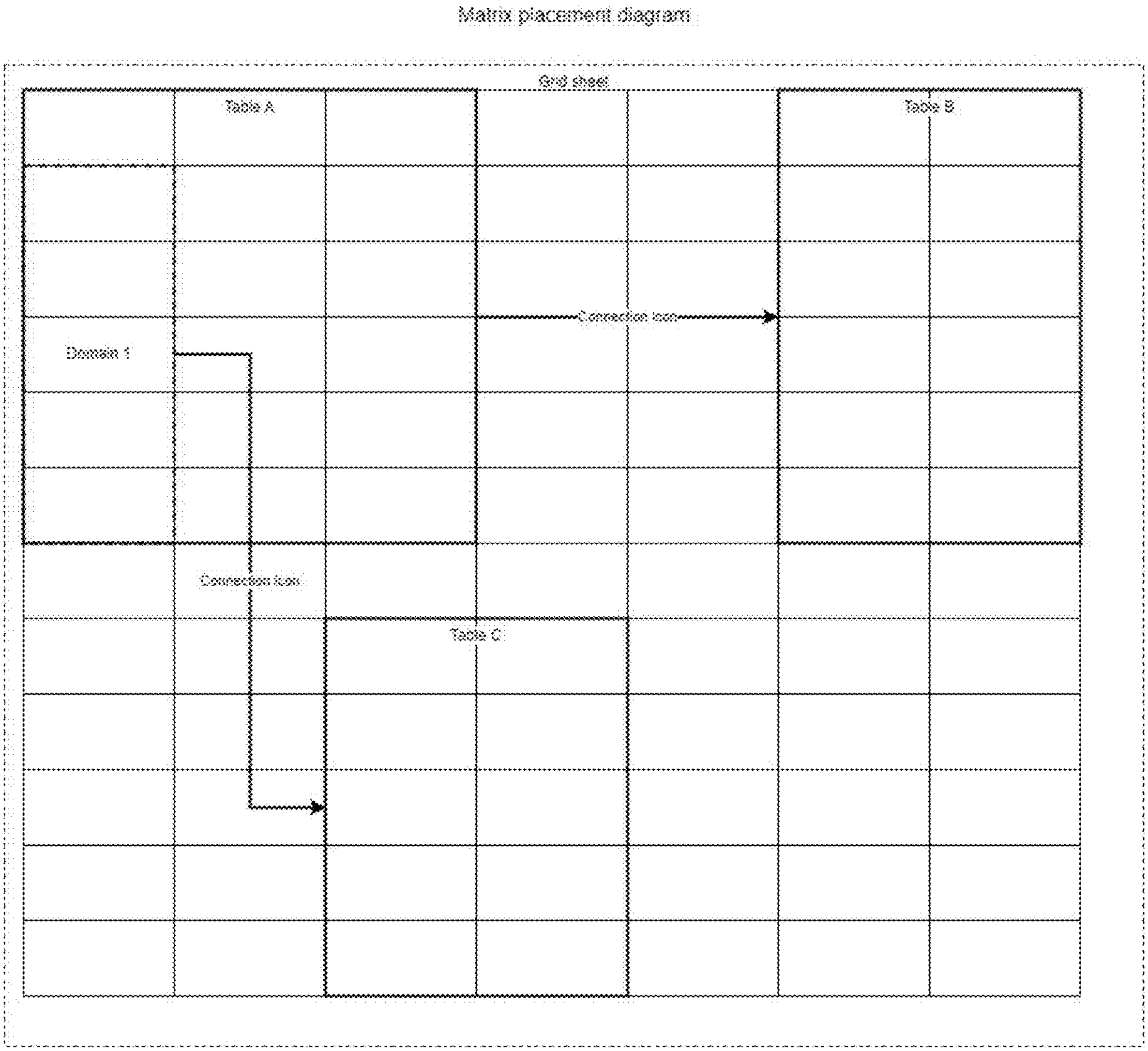

FIG. 23 shows a matrix placement diagram. FIG. 23 exemplifies a placement on the above-mentioned grid sheet.

Table A (3×6) is connected with Table B (2×6) through a connection icon to make up one table. Domain 1 (1×5) of Table A is connected with Table C (2×5) to make up one table. It is also allowable to make it possible to graphically determine whether that discretization table is an inclusion table (by using a margin or shapes of the connection icons).

The present computer system can be applied to a web system accessed by a lot of users by using portable terminals such as smartphones. It can be applied to a web system for which it is important that telecommunication timing be controlled and distribution targets be managed, especially. Further, it can be applied to a web system for which it is requested that acquisition, linkage, and distribution of status information about a related web system, and reception and transmission of other asynchronous signals be carried out in appropriate timing.

<<Memorandum of Technical Matters Considered to be Useful for Amending or Dividing the Present Application after Filing the Application>>

By focusing on an API for a business user and an API for an end user, a cutting of the present invention is also allowed to be figured out.

Program editing according to the present invention allows even a dynamic correction or modification that gives modification to a system working currently. It is intended, for example, to respond flexibly to even such a case as even if a certain customer gets out of a project, the project needs to go on. By focusing on such a dynamic editing, the present invention is allowed to be figured out.

INDUSTRIAL APPLICABILITY

The computer system according to the present invention can be used in all industries wherein a business user who, for end users who access a web server with their terminal devices, acts through the web server or holds an event is present.

EXPLANATION OF SYMBOLS

10 Server
21, 22, 23, 24 Administrator user terminal
31, 32, 33, 34 Ordinary user terminal
51 Database device
61 Behavior control system
62 Behavior management model editing system
63 Behavior management model editing device
64 Control object editing device
65 Behavior management model
66 Control object
67 Editing user interface device

What is claimed is:

1. A computer system in which to carry out programming or maintenance, wherein maintenance includes reuse and updates, of a system, comprising:

a network interface unit; and a processor configured to categorize classes of program objects in accordance with functionalities of and type information on return values and arguments of methods, and associate classes or instances with group objects having functionalities corresponding to object categories, wherein the program objects include a plurality of control objects which are objects categorized in accordance with input/output functionality and take charge of linkage with a terminal device, a database device, and other systems or devices, the group objects include a placement group object defined on a basis of category information on the control objects which can be associated, have a behavior management model integrating the control objects and the placement group object in terms of functionality for the type information and further have a behavior control system carrying out, by structurally assembling the control objects, behavior management in which to adjust each behavior of the control objects in association with the placement group object, and a behavior management model editing system having a control object editing user interface device providing statement functionality of stating functionality detail of the control objects to an application program builder and a behavior management model editing user interface device providing statement functionality of the behavior management model to an application program builder, the control objects have input/output ports having input/output functionality accompanying control of timing including timing of standby, event/trigger wait reception or interrupts and are, by a group of input/output ports categorized in accordance with said type information and functionality, defined and categorized as control object categories, in relation to said behavior management model, and the placement group object can, in order to build the behavior management model, have processing sequence transition functionality being transition management functionality based on a transition definition set, wherein the transition definition set is an assembly of transition definitions to define a transition making an output port and an input port correspond with each other, between category or categorized input/output ports and priority processing request functionality being transition management functionality based on identification information on group placement control objects, the control objects associated by using the processing sequence transition functionality and the priority processing request functionality being dynamically managed by response to a system and timing information.

2. The computer system according to claim 1, wherein said control object categories have inheritance relationship with each other on condition that input/output functionality be inherited from an inheritance source.

3. The computer system according to claim 1, allowing, by setting said placement group object to be indefinite, an object to be placed, to be dynamically placed.

4. The application program building method using the computer system according to claim 2 and having a category defining step of defining, in accordance with specifications on interfaces, categories of said control objects, or placer categories of control objects associated with said placement group objects or of placers being a placement group, an inheritance step of defining category prototypes of control objects and priority request/processing sequence transition functionalities in correspondence with each other by using inheritance of category information from inheritance source to inheritance destination, and a category designing step of carrying out category designing of control objects by combining the category prototypes.

5. The application program building method according to claim 4, having a statement class calling step in which to call a statement class corresponding to an instance at a point when any of a control object, a placement group, priority processing request definition, and processing sequence transition definition is specified as a category, or when it is placed a category information extraction step in which to extract category information from a statement class called in the calling step a category requirement calling step in which to call a category requirement on the basis of category information extracted in the category information extraction step, and a category accordance check step in which to check on whether or not a category requirement called in the category requirement calling step and a statement step called in the above statement class calling step accord with each other.

6. The application program building method according to claim 4, having an output source port priority processing request submitting step in which a priority processing request is made by an output source port, a priority processing request receiving step in which to make a priority processing request to an input destination identification group and/or a reference placement group, an information receiving step in which to receive real placement information and/or status information on an identification group and reference placement group subjected to transition definition, a priority condition calculation step in which to calculate priority conditions for an output destination by using information of any one type or more out of transition output information, relatedness real placement information, relatedness status information and real placement information, an identification information extraction step in which to extract, on the basis of priority condition calculation made in the priority condition calculation step, identification information on an input destination placer from identification group real placement information, and a transition output information sending step in which to send transition output information to an input destination identification group port together with transition destination specifying information (a list) or to a corresponding placer port.

7. The application program building method according to claim 5, having a category accordance check step in which to check on whether a placer accords in category and to determine, if it does not accord, that it cannot be placed, a numerical range accordance check step in which to check on whether numerical range conditions are accorded with, a placer property accordance check step in which to determine that a placer which has been associated cannot be placed, if it does not accord with determination conditions in accordance with properties, and an association check target incorporation step, in which to incorporate, into the association check targets, associated placers out of placers which can be placed, and carries out checks from the category accordance check step to the association check target incorporation step, sequentially in an order in which the placers have been registered, for all placers being targets of all the association checks.

8. The computer system according to claim 1, wherein said control object editing user interface device realizes said placement group functionality through a graphical user interface, by using a grid sheet where a grid allowed to accommodate object icons are spread in a matrix form.

9. The computer system according to claim 8, defining said placement group object by using a table in which an object obtained by cutting off part of said grid sheet as a matrix is given said priority processing request functionality and said processing sequence transition functionality as said placement group.

10. The application program building method using the computer system according to claim 9 and having a grid sheet designing step in which to prepare one or a plurality of user interface grid sheets and to give identification information to each of them, a table placing step in which to carry out algorithm designing, to determine a table corresponding to a processing flow, to determine a necessary matrix range, and to allocate the table on a grid sheet, an axis defining step in which to define two axes or three axes of a table matrix on whether they are identification axes acting as an identification group to accommodate modules or processing axes used as transition control information a placer category defining step in which to give an identification axis sequence a placer category definition, and a module placing step in which to place modules on a grid.

* * * * *